US012670324B2

(12) United States Patent
Cunningham et al.

(10) Patent No.: US 12,670,324 B2
(45) Date of Patent: Jun. 30, 2026

(54) GENERATING LARGE LANGUAGE MODEL OUTPUTS FROM STORED CONTENT ITEMS

(71) Applicant: Dropbox, Inc., San Francisco, CA (US)

(72) Inventors: Eric Cunningham, Kirkland, WA (US); Bradley Crossen, Texas City, TX (US); Tejas Patel, Bellevue, WA (US); Royce Ausburn, Melbourne (AU); Brett Bergeron, Portland, OR (US)

(73) Assignee: Dropbox, Inc., San Francisco, CA (US)

( * ) Notice: Subject to any disclaimer, the term of this patent is extended or adjusted under 35 U.S.C. 154(b) by 238 days.

(21) Appl. No.: 18/469,357

(22) Filed: Sep. 18, 2023

(65) Prior Publication Data

US 2025/0094708 A1 Mar. 20, 2025

(51) Int. Cl.

| | |
|---|---|
| ***G06F 40/284*** | (2020.01) |
| ***G06F 16/907*** | (2019.01) |
| ***G06F 40/205*** | (2020.01) |
| ***G06F 40/40*** | (2020.01) |

(52) U.S. Cl.

CPC .......... *G06F 40/284* (2020.01); *G06F 16/907* (2019.01); *G06F 40/205* (2020.01); *G06F 40/40* (2020.01)

(58) Field of Classification Search

None

See application file for complete search history.

(56) References Cited

U.S. PATENT DOCUMENTS

| | | | |
|---|---|---|---|
| 11,314,922 | B1 | 4/2022 | Ramezani et al. |
| 11,687,829 | B2 | 6/2023 | Hanley et al. |
| 2021/0406476 | A1 | 12/2021 | Pan et al. |
| 2022/0253472 | A1 | 8/2022 | Oberoi et al. |
| 2022/0318504 | A1 | 10/2022 | Malkiel et al. |

(Continued)

OTHER PUBLICATIONS

Cui Z., et al., "M6-Rec: Generative Pretrained Language Models are Open-Ended Recommender Systems," arXiv:2205.08084v2 [cs. IR], May 19, 2022, 11 pages, Retrieved from the Internet: URL: https://arxiv.org/abs/2205.08084.

(Continued)

*Primary Examiner* — Nicole A K Schmieder

(74) *Attorney, Agent, or Firm* — Keller Preece PLLC

(57) ABSTRACT

The present disclosure relates to systems, non-transitory computer-readable media, and methods for generating content-item-specific large language model responses from content items by segmenting a content item and selecting relevant sections of the content item to provide to a large language model to generate a corresponding output. In particular, in one or more embodiments, the disclosed systems can generate a text representation that includes a plurality of text segments each comprising a number of tokens of the text representation. Further, the systems can extract, from the plurality of text segments, segment-specific text embeddings that correspond to respective portions of the text representation of the content item. Additionally, the systems can determine a segment-specific text embedding corresponding to a model output request. Moreover, the systems can generate a model output by passing a text segment corresponding to the segment-specific text embedding to a large language model together with the model output request.

20 Claims, 12 Drawing Sheets

(56) References Cited

U.S. PATENT DOCUMENTS

| | | | | |
|---|---|---|---|---|
| 2022/0414330 | A1 | 12/2022 | Roy et al. | |
| 2023/0097150 | A1 | 3/2023 | Agrawal et al. | |
| 2023/0100508 | A1 | 3/2023 | Abobakr et al. | |
| 2023/0112740 | A1 | 4/2023 | Alqaderi et al. | |
| 2023/0114897 | A1 | 4/2023 | Beaver et al. | |
| 2023/0143418 | A1 | 5/2023 | Raghunathan et al. | |
| 2023/0169516 | A1 | 6/2023 | Rapp et al. | |
| 2023/0186618 | A1 | 6/2023 | Koukoumidis et al. | |
| 2024/0362286 | A1* | 10/2024 | He | G06F 16/93 |
| 2024/0419710 | A1* | 12/2024 | Matson | G06N 3/08 |
| 2025/0021739 | A1* | 1/2025 | Shin | G06F 40/103 |

OTHER PUBLICATIONS

Damrongrat C., et al., "Question Chunk Extraction for Improving Question Similarity," Proceedings of the 11th International Conference on Advances in Information Technology (IAIT), Jul. 2020, 6 pages, Retrieved from the Internet: URL: https://dl.acm.org/doi/10.1145/3406601.3406645.

Malkiel I., et al., "Interpreting BERT-based Text Similarity via Activation and Saliency Maps," WWW '22: Proceedings of the ACM Web Conference, Apr. 2022, pp. 3259-3268, Retrieved from the Internet: URL: https://dl.acm.org/doi/10.1145/3485447.3512045.

* cited by examiner

900

Generating A Text Representation That Includes A Plurality Of Text Segments *902*

Extracting Segment-Specific Text Embeddings That Correspond To Respective Portions Of The Text Representation Of The Content Item *904*

Determining A Segment-Specific Text Embedding Corresponding To A Model Output Request *906*

Generating A Model Output By Passing A Text Segment Corresponding To The Segment-Specific Text Embedding To A Large Language Model Together With The Model Output Request *908*

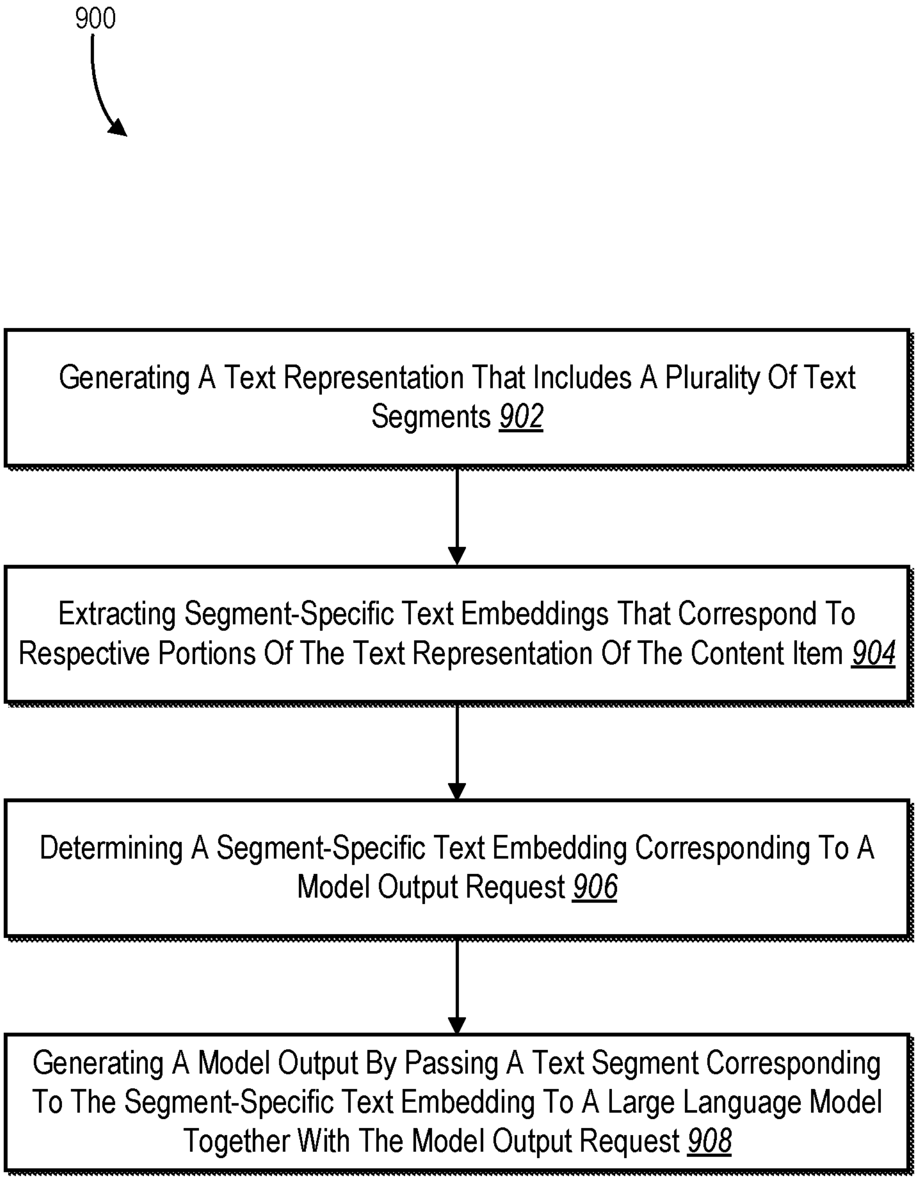

*Fig. 9*

GENERATING LARGE LANGUAGE MODEL OUTPUTS FROM STORED CONTENT ITEMS

BACKGROUND

Recent years have seen significant developments in machine learning capabilities across many fields, including image generation, data processing, and query response from natural language. For example, recent advancements in large language models have led to systems that can receive natural language prompts and can generate natural language responses based on an immense amount of general training data. To illustrate, some existing systems can generate text responses in response to natural language prompts for a variety of tasks, such as language translation, text classification, and content description generation.

Although some conventional systems can generate text-based responses, such systems nevertheless exhibit a number of problems in relation to accuracy and efficiency. For instance, conventional systems inefficiently utilize computing resources, such as processing power and memory in generating redundant responses to model prompts. Indeed, in many scenarios, conventional systems receive repeat prompts and perform high-frequency, repeat actions to generate the same redundant responses over and over. Such repetition wastes computational resources when regenerating the same responses (or new responses reflecting the same information) from the same prompts and/or the same referenced source data many times over. Reapplying large language models to execute an entire workflow for each repeated request for the same output from the same input expends unnecessary computer resources that could otherwise be preserved with a more efficient system.

In addition to their computational inefficiencies, some conventional systems generate inaccurate responses using large language models. For example, many existing large language models are trained over enormous databases of common general data to achieve broad coverage of output generation across a wide array of contexts. Unfortunately, a consequence of such wide-ranging and generalized training is that the large language models used by conventional systems often hallucinate, generating erroneous or incorrect responses (or other outputs) that the models treat as true. Without ways to remediate the inaccurate outputs generated by existing large language models, many conventional systems produce unreliable outputs.

These along with additional problems and issues exist with regard to conventional large language model systems.

SUMMARY

Embodiments of the present disclosure provide benefits and/or solve one or more of the foregoing or other problems in the art with systems, non-transitory computer-readable media, and methods for generating content-item-specific large language model responses from files by sectioning or segmenting a content item and selecting relevant sections or portions of a content item to provide to a large language model to generate a corresponding output. In particular, the disclosed systems utilize a specialized large language model internal to a content management system that can process and analyze stored content items for user accounts and can generate outputs in the form of summaries and/or query responses from data included within one or more stored content items. Indeed, the disclosed systems can integrate content items stored for a user account to generate large language model outputs specific to the content items. For example, the disclosed systems can receive input from a client device to select one or more content items and generate text representations of the content items, and can partition the text representation into text segments (e.g., of a pre-defined token length). Further, the disclosed systems can determine or select one or more text segments to provide to a large language model based on a model output request (e.g., a request from a client device to generate a summary or a query response). The disclosed systems can utilize the large language model to generate a model output from a prompt that includes one or more selected text segments and the model output request.

Additional features and advantages of one or more embodiments of the present disclosure are outlined in the description which follows, and in part can be determined from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

FIG. 9 illustrates an example series of acts for generating content-item-specific large language model responses from content items by sectioning or segmenting a content item and selecting relevant sections or portions of a content item to provide to a large language model to generate a corresponding output.

DETAILED DESCRIPTION

Figure 1:
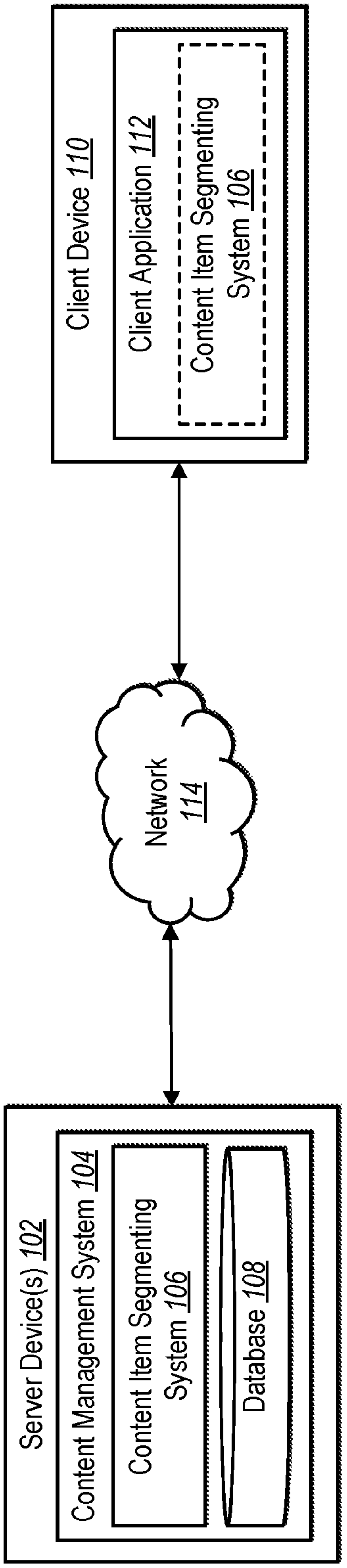
FIG. 1 illustrates a diagram of an environment in which a content item segmenting system can operate in accordance with one or more embodiments.

This disclosure describes one or more embodiments of a content item segmenting system that generates content-item-specific model outputs from content items utilizing a large language model to process portions of the content items. More specifically, in some embodiments, the content item segmenting system sections or segments into text segments a text representation of a content item and selects relevant text segments to provide to a large language model with a model output request. In many scenarios, the content item segmenting system receives requests from client devices to analyze, understand and generate additional content from stored content items for user accounts of a content management system. As part of this process, the content item segmenting system can integrate or utilize one or more content items for analysis through a large language model to generate summaries from, and/or generate queries responses for, the one or more content items. The content item segmenting system does so through a variety of methods as described below.

For example, the content item segmenting system can receive a model output request from a client device (e.g., a request to summarize all or part of one or more content items and/or to generate a query response based on one or more content items). Based on the output request, the content item segmenting system can select content items for analysis by a large language model. For instance, the content item segmenting system can receive from a client device a model output request comprising, by way of example, and not limitation, a summary generation request or a response generation request. Further, the content item segmenting system can generate an output request embedding from the model output request. Additionally, the content item segmenting system can select one or more content items for analysis by a large language model according to the model output request (e.g., based on the output request embedding).

As part of the process for analyzing the content item/s according to the model output request with the large language model, the content item segmenting system can generate a content item text representation, segment the text thereof, and extract segment-specific text embeddings. For instance, the content item segmenting system can utilize a content conversion model to generate a text representation of one or more content items (e.g., converting the content item(s) from their initial, native format to a text format). Additionally, the content item segmenting system can generate a plurality of text segments, each comprising a (specified or determined) number of tokens of the text representation utilizing the content conversion model. The content item segmenting system can then extract a segment-specific text embedding corresponding to each text segment. For instance, the content item segmenting system can generate a latent vector (or some other computerized representation) representing a text segment in a latent embedding space for comparison with the output request embedding mentioned above.

Once the content item segmenting system converts the content item into a plurality of text-specific segment embeddings, the content item segmenting system can determine which text segments to send (with a model output request) to a large language model. As indicated above, the content item segmenting system extracts an output request embedding from the model output request. The content item segmenting system can then compare the output request embedding with the segment-specific text embeddings of the text representation/s of the content item/s. For example, the content item segmenting system performs this comparison within a latent embedding space and determines the most relevant (e.g., closest or nearest in the embedding space) segment-specific text embeddings to the output request embedding.

The content item segmenting system can then provide the text segments corresponding to the most relevant segment-specific text embeddings to the large language model along with the model output request for generation of a model output (e.g., a summary or a query response). For example, once the content item segmenting system determines which segment-specific text embeddings are most relevant to the output request embedding, the content item segmenting system can send the text segments corresponding to the selected segment-specific text embeddings with the model output request to the large language model. In addition to providing the most relevant text segments and the model output request, the content item segmenting system can also provide a threshold number of additional text segments as part of the large language model prompt. For instance, by way of example, and not limitation, the content item segmenting system can send the first and second text segments beginning at the start point of the content item/s to provide context and to guide the large language model in its output generation.

Additionally, the content item segmenting system can cache data (e.g., content items, prompts, text representations of content items, and/or model outputs) for later reuse. For example, when the content item segmenting system generates a text representation, segments the text of the text representation, extracts segment-specific text embeddings, determines which text segments to send to the large language model, or generates a response from the large language model, the product or data of each step can be cached. The cached data/work product can then be reused in response to new model output requests.

The content item segmenting system provides a variety of technical advantages relative to conventional systems. For example, by integrating directly with a user account's content items and caching previously processed work (e.g., previously converted text representations of content items as well as previous prompts and corresponding summaries/responses), the content item segmenting system improves computational efficiency relative to conventional systems. Specifically, the content item segmenting system can cache or store inputs provided to, and outputs generated from, a large language model (and/or a content conversion model) to circumvent the need to reapply the model for repeat output requests on identical data. Thus, compared to prior systems that rerun large language models for each prompt, irrespective of whether that prompt has been previously provided, the content item segmenting system can preserve computer resources by accessing cached data instead. The computational savings that result from reapplying expensive large language models over and over are especially pronounced for frequently repeated/requested outputs across large numbers of client devices.

As an additional efficiency improvement, the content item segmenting system provides improves navigational efficiency over prior systems as well, with more efficient interfaces and/or interactions to generate outputs from large language models. For example, the content item segmenting system integrates with content items of a user account to convert the content items to text representations, extract information from the content items in the form of segment-specific text embeddings, and generate an output by sending the embeddings to a large language model with an output request. Thus, rather than requiring input from a client device selecting or specifying particular portions of text to provide to a model, then copying and pasting text into a large language model interface, the content item segmenting system can automatically process content items to determine and extract relevant portions of data to use for generating output using a large language model. The content item segmenting system thus reduces the number of client device interactions for accessing desired data or functionality when compared with some prior systems.

In addition to improving computational and navigational efficiency, the content item segmenting system can improve accuracy by using a content item segmentation approach. For instance, by generating text segments and by determining which of the text segments are most relevant to a particular output request, the content item segmenting system improves accuracy relative to conventional systems. Indeed, rather than generating an inaccurate summary or a query response that results using a large language model to process a poorly constructed prompt (which can result in hallucination) like many existing systems, the content item segmenting system generates and determines portions of content items (corresponding to extracted text segments) that specifically apply to generating a requested model output. In some cases, the content item segmenting system further utilizes one or more initial text segments extracted from a content item as basis for providing context to guide a large language model. Experimenters have demonstrated that using initial text segments to provide such contextual cues further improves the accuracy of a large language model in generating requested outputs.

Moreover, the content item segmenting system provides several first-of-a-kind improvements over conventional systems. Specifically, the content item segmenting system can provide indications of sources used in generating model outputs, either as locations within a single content item or across multiple content items. For instance, the system can provide indications of locations, such as the particular content item and the location within the content item, corresponding to the text segment identified by the large language model as relevant. In some cases, the system can link the locations for navigating to the location of the source with a single click within a model output interface.

As another unique function, the content item segmenting system can integrate a unique large language model of a content management system with data from content items stored for user accounts within the content management system. Indeed, the content item segmenting system can use a large language model to process whole content items and even collections of content items. In contrast, conventional systems require a user to input natural language text into large language models, and the models cannot process data from content items. Indeed, the content item segmenting system can integrate content items by using a content conversion and text segmentation approach, as described herein. Thus, unlike prior systems, the content item segmenting system can generate large language model outputs informed by specific data within a content item or a collection of content items stored within a content management system.

As illustrated by the foregoing discussion, the present disclosure utilizes a variety of terms to describe features and advantages of the content item segmenting system. Additional detail is now provided regarding the meaning of such terms. For example, as used herein, the term "digital content item" (or simply "content item") refers to a digital object or a digital file that includes information interpretable by a computing device (e.g., a client device) to present information to a user. A digital content item can include a file or a folder such as a digital text file, a digital image file, a digital audio file, a webpage, a website, a digital video file, a web file, a link, a digital document file, or some other type of file or digital object. A digital content item can have a particular file type or file format, which may differ for different types of digital content items (e.g., digital documents, digital images, digital videos, or digital audio files). In some cases, a digital content item can refer to a remotely stored (e.g., cloud-based) item or a link (e.g., a link or reference to a cloud-based item or a web-based content item) and/or a content clip that indicates (or links/references) a discrete selection or segmented sub-portion of content from a webpage or some other content item or source. A content item can also include application-specific content that is siloed to a particular computer application but is not necessarily accessible via a file system or via a network connection. A digital content item can be editable or otherwise modifiable and can also be sharable from one user account (or client device) to another. In some cases, a digital content item is modifiable by multiple user accounts (or client devices) simultaneously and/or at different times.

Further, as used herein, the term "large language model" refers to a machine learning model trained to perform computer tasks to generate or identify content items in response to trigger events (e.g., user interactions, such as text queries and button selections). In particular, a large language model can be a neural network (e.g., a deep neural network) with many parameters trained on large quantities of data (e.g., unlabeled text) using a particular learning technique (e.g., self-supervised learning). For example, a large language model can include parameters trained to generate model outputs (e.g., content items, summaries, or query responses) and/or to identify content items based on various contextual data, including graph information from a knowledge graph and/or historical user account behavior. In some cases, a large language model comprises a GPT model such as, but not limited to, ChatGPT.

Relatedly, as used herein, the term "machine learning model" refers to a computer algorithm or a collection of computer algorithms that automatically improve for a particular task through iterative outputs or predictions based on the use of data. For example, a machine learning model can utilize one or more learning techniques to improve accuracy and/or effectiveness. Example machine learning models include various types of neural networks, decision trees, support vector machines, linear regression models, and Bayesian networks. In some embodiments, the morphing interface system utilizes a large language machine-learning model in the form of a neural network.

Along these lines, the term "neural network" refers to a machine learning model that can be trained and/or tuned based on inputs to determine classifications, scores, or approximate unknown functions. For example, a neural network includes a model of interconnected artificial neurons (e.g., organized in layers) that communicate and learn to approximate complex functions and generate outputs (e.g., content items or smart topic outputs) based on a plurality of inputs provided to the neural network. In some cases, a neural network refers to an algorithm (or set of algorithms) that implements deep learning techniques to model high-level abstractions in data. A neural network can include various layers, such as an input layer, one or more hidden layers, and an output layer that each perform tasks for processing data. For example, a neural network can include a deep neural network, a convolutional neural network, a transformer neural network, a recurrent neural network (e.g., an LSTM), a graph neural network, or a generative adversarial neural network. Upon training, such a neural network may become a large language model.

Furthermore, as used herein, the term "content conversion model" refers to a model (e.g., a machine learning model) or a collection of models for converting digital content from one format, type, or code structure to another. For example, the content conversion model can convert one type of content item to another type of content item. To illustrate further, the content conversion model can convert a video or a photograph to a text file or a file containing text descriptions of the video or photograph content. The content conversion model can include instructions for utilizing various application programming interfaces (APIs) to convert content items from one type to another, such as APIs to access a model for extracting data, APIs to access transcription models, etc. In some cases, a content conversion model includes or incorporates a compatibility graph to map the conversion process between content types.

Moreover, as used herein, the term "text representation" refers to a representation of digital content in text form. In particular, text representation can include the text of a content item or a text description of one or more content item(s) or portions thereof (e.g., as generated by a compatibility graph). To illustrate, a text representation can include, but is not limited to, the text of digital content (e.g., a content item) such as the text of an electronic document, a text description of non-text portions of an electronic document, a text description of a digital image, a digital video, or other content as described above. For example, a text representation can include a string of characters that describe, define, or represent a content item.

Relatedly, the term "compatibility graph," as used herein, refers to a data graph that defines or indicates relationships between content items and/or types of content items (e.g., using nodes and edges). In particular, a compatibility graph includes, but is not limited to, a set of nodes and edges that indicate conversion paths for converting a content item of one type to a content item of another type (e.g., using multiple conversion steps to traverse across nodes linking the types in the graph). For example, a compatibility graph can map a conversion from a digital video or a digital image into a text representation wherein the video or image can be converted according to a specific rubric or method. In particular, the content item segmenting system can use a compatibility graph to generate a text representation of digital images such that each digital image is represented in standardized text form, to generate a text representation of digital videos such that each digital video is represented in standardized text form, to generate a text representation of a text-containing document such that each text-containing document is represented in standardized text form, etc.

Furthermore, as used herein, the term "text segment" refers to a portion of a text representation containing a specified number of tokens of a text representation of a content item. For example, a text segment includes a specified number of tokens or at least a threshold number of tokens. In some cases, a text segment is made up of 256 tokens (including characters and spaces). In these or other cases, each text segment of a text representation of a content item includes the same number of tokens, while in other cases, different text segments have different lengths or different numbers of tokens. Relatedly, the term "segment-specific text embedding," as used herein, refers to a token-specific embedding (e.g., a latent vector) of a text segment. For example, a segment-specific text embedding refers to a latent embedding, such as a mathematical or computerized representation of a text segment in an embedding space, interpretable by specific machine learning models.

Additionally, as used herein, the term "model output request" refers to computer code indicating or requesting output from a large language model (and/or another model) in relation to a content item. For instance, a model output request includes a prompt for a large language model. In particular, a model output request refers to a request that the content item segmenting system can receive and pass to a large language model to generate a response, such as a text response (e.g., a model output) from the large language model. To illustrate, a model output can include, by way of example, and not limitation, a summary generation request or a response generation request. Relatedly, the terms "summary generation request" and "response generation request" refer to a prompt (e.g., for submission to a large language model) requesting a summary of content or a response to a query regarding content respectively. Further, as used herein, the term "output request embedding" refers to an embedding (e.g., a latent vector) of a model output request.

Additional detail regarding the content item segmenting system will now be provided with reference to the figures. For example, FIG. 1 illustrates a schematic diagram of an example system environment for implementing a content item segmenting system 106 in accordance with one or more embodiments. An overview of the content item segmenting system 106 is described in relation to FIG. 1. Thereafter, a more detailed description of the components and processes of the content item segmenting system 106 is provided in relation to the subsequent figures.

As shown, the environment includes server(s) 102, a client device 110, and a network 114. Each of the components of the environment can communicate via the network 114, and the network 114 may be any suitable network over which computing devices can communicate. Example networks are discussed in more detail below in relation to FIGS. 10-11.

As mentioned above, the example environment includes client device 110. The client device 110 can be one of a variety of computing devices, including a smartphone, a tablet, a smart television, a desktop computer, a laptop computer, a virtual reality device, an augmented reality device, or another computing device as described in relation to FIGS. 10-11. The client device 110 can communicate with the server(s) 102 and/or the database 108 via the network 114. For example, the client device 110 can receive user input from a user interacting with the client device 110 (e.g., via the client application 112) to, for instance, access, generate, modify, or share a content item, to collaborate with a co-user of a different client device, or to select a user interface element. In addition, the content item segmenting system 106 on the server(s) 102 can receive information relating to various interactions with content items and/or user interface elements based on the input received by the client device 110 (e.g., to access content items, generate model outputs from content items, or perform some other action).

As shown, the client device 110 can include a client application 112. In particular, the client application 112 may be a web application, a native application installed on the client device 110 (e.g., a mobile application, a desktop application, etc.), or a cloud-based application where all or part of the functionality is performed by the server(s) 102. Based on instructions from the client application 112, the client device 110 can present or display information, including a user interface for presenting content items or model outputs from the content management system 104 or from other network locations.

As illustrated in FIG. 1, the example environment also includes the server(s) 102. The server(s) 102 may generate, track, store, process, receive, and transmit electronic data, such as digital content items, model outputs, text segments, interface elements, interactions with digital content items, interactions with interface elements, and/or interactions between user accounts or client devices. For example, the server(s) 102 may receive data from the client device 110 in the form of a text query to perform a particular task or to generate a particular content item. In addition, the server(s) 102 can transmit data to the client device 110 in the form of an intelligent assistant interface that includes a generated content item resulting from performing the requested task. Indeed, the server(s) 102 can communicate with the client device 110 to send and/or receive data via the network 114. In some implementations, the server(s) 102 comprise(s) a distributed server where the server(s) 102 include(s) a number of server devices distributed across the network 114 and located in different physical locations. The server(s) 102 can comprise one or more content servers, application servers, communication servers, web-hosting servers, machine learning server, and other types of servers.

As shown in FIG. 1, the server(s) 102 can also include the content item segmenting system 106 and the database 108 as part of a content management system 104. The content management system 104 can communicate with the client device 110 to perform various functions associated with the client application 112 such as managing user accounts, managing content collections, managing content items, and facilitating user interaction with the content collections and/or content items. Indeed, the content management system 104 can include a network-based smart cloud storage system to manage, store, and maintain content items and related data across numerous user accounts, including user accounts in collaboration with one another. In some embodiments, the content item segmenting system 106 and/or the content management system 104 utilize the database 108 to store and access information such as digital content items.

Although FIG. 1 depicts the content item segmenting system 106 located on the server(s) 102, in some implementations, the content item segmenting system 106 may be implemented by (e.g., located entirely or in part on) one or more other components of the environment. For example, the content item segmenting system 106 may be implemented by the client device 110. For example, the client device 110 can download all or part of the content item segmenting system 106 for implementation independent of, or together with, the server(s) 102.

In some implementations, though not illustrated in FIG. 1, the environment may have a different arrangement of components and/or may have a different number or set of components altogether. For example, the client device 110 may communicate directly with the content item segmenting system 106, bypassing the network 114. As another example, the environment can include the database 108 located external to the server(s) 102 (e.g., in communication via the network 114), located on the server(s) 102 as illustrated in FIG. 1, and/or on the client device 110.

Figure 2:
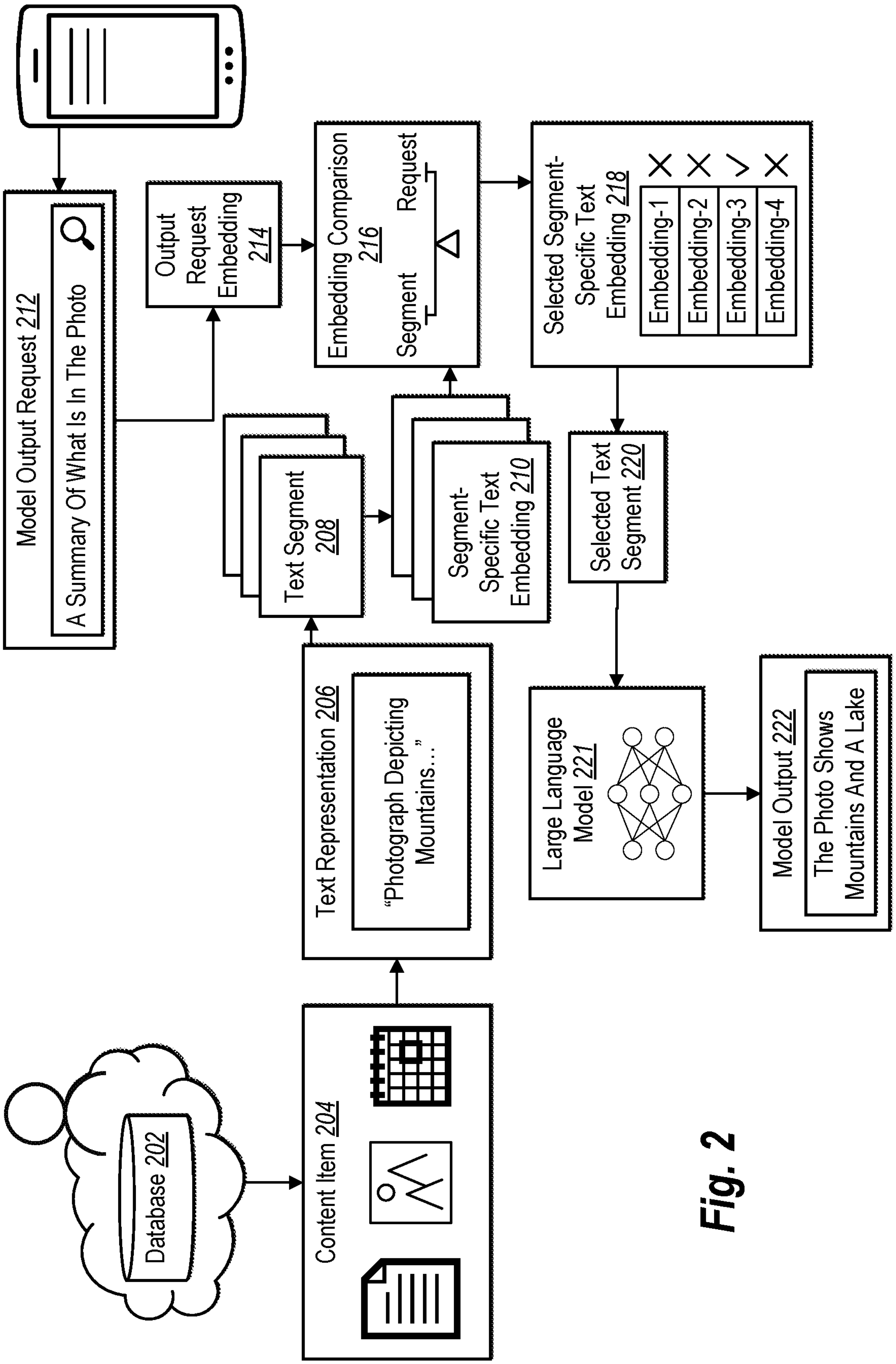
FIG. 2 illustrates an overview of a content item segmenting system generating a model output specific to one or more content items using a large language model in accordance with one or more embodiments.

As mentioned above, in certain embodiments, the content item segmenting system 106 can generate model outputs from one or more content items using a large language model to process relevant portions of the content item(s). FIG. 2 illustrates an exemplary workflow of a content item segmenting system 106 generating a model output 222 specific to one or more content items 204 using a large language model in accordance with one or more embodiments. For example, in some implementations, the content item segmenting system 106 can select one or more content items 204 stored on a database 202. Additionally, the content item segmenting system 106 can utilize a content conversion model to generate a text representation 206 comprising a plurality of text segments. For example, in some embodiments, the text segments of the text representation 206 can each comprise a predetermined number of tokens of the text representation 206.

As further illustrated in FIG. 2, in some embodiments, the content item segmenting system 106 can extract text embeddings from the text segments and a model output request 212 for comparison. For instance, the content item segmenting system 106 can extract segment-specific text embeddings 210 that correspond to the respective text segments 208. Additionally, in some embodiments, the content item segmenting system 106 can receive a model output request 212 from a client device. Further, the content item segmenting system 106 can extract an output request embedding 214 from the model output request 212. Moreover, the content item segmenting system 106 can compare the segment-specific text embeddings 210 with the output request embedding 214 by performing an embedding comparison 216 (e.g., within an embedding space).

Furthermore, in one or more embodiments, the content item segmenting system 106 can generate a model output 222 by passing selected text segments, such as selected text segment 220, (along with the model output request 212) to a large language model 221. For example, by performing the embedding comparison 216, the content item segmenting system 106 can determine one or more segment-specific text embeddings 210 which are nearest to the output request embedding 214. In one or more embodiments, the content item segmenting system 106 can utilize the one or more selected segment-specific text embeddings 218 (e.g., "Embedding-3" from the candidate embeddings shown in FIG. 2) to select the corresponding text segments representing portions of the content item 204 that correspond to the model output request 212 and which are therefore used as the basis for generating the model output 222. For example, the content item segmenting system 106 selects the selected text segment 220 for the model output request 212, as shown in FIG. 2. The content item segmenting system 106 can then generate the model output 222 by passing the selected text segments 220 to a large language model 221 together with the model output request 212. In some embodiments, the content item segmenting system 106 thus generates the model output 222 in the form of a summary of one or more portions of the content item 204 or a query response concerning one or more portions of the content item 204.

Figure 3:
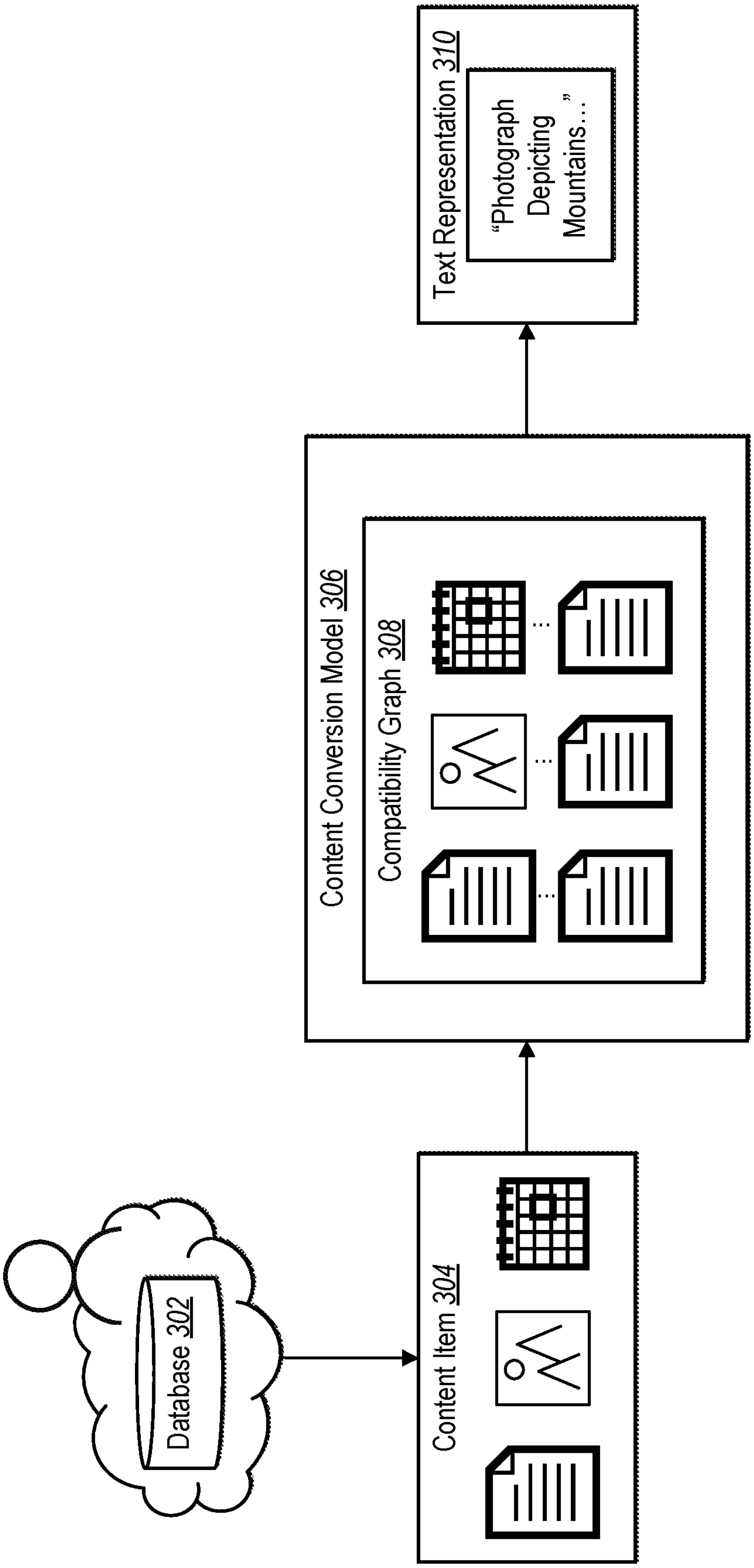
FIG. 3 illustrates an example diagram of content item segmenting system utilizing a content conversion model to generate a text representation from one or more content items in accordance with one or more embodiments.

As previously mentioned, the content item segmenting system 106 can select one or more content items and can convert the selected content items to a text representation utilizing a content conversion model 306. FIG. 3 illustrates an overview of the content item segmenting system 106 utilizing a content conversion model 306 to generate a text representation 310 from one or more content items 304 in accordance with one or more embodiments. For example, in one or more embodiments, the content item segmenting system 106 can select one or more content items 304 stored on a database 302 associated with a user account. Further, the content item segmenting system 106 can utilize a content conversion model to convert each of content items 304 to a corresponding text representation 310.

As illustrated in FIG. 3, the content item segmenting system 106 can utilize the content conversion model 306 to generate a text representation 310 for the content item 304. For instance, the content item segmenting system 106 can utilize the content conversion model 306 to generate a set of text characters that describe the content item 304 according to a compatibility graph 308. As shown in FIG. 3. For example, in one or more embodiments, the compatibility graph 308 can include instructions or computer code for converting the content item 304 (and other content items of varying types or formats) to a text representation 310.

In some implementations content item segmenting system 106 can integrate the content conversion model 306 with a client device user interface. For example, the content item segmenting system 106 can integrate the content conversion model 306 via a user interface of a client device and an application programming interface (API) servicer. Specifically, in some implementations, the content item segmenting system 106 can integrate the user interface with the API servicer which can parse input from the user interface and forward it to the content conversion model 306. Further, the content conversion model 306 can utilize various APIs to execute its various functions, for example, converting content items to text representations, and storing completed work (e.g., text representations) in a cache.

Moreover, in one or more implementations, the content item segmenting system 106 can utilize the content conversion model 306 to convert the content item 304 stored in the database 302 from one content type to another. For instance, the content conversion model 306 can construct (and/or use or traverse) a compatibility graph 308 to convert content item 304 to the text representation 310. Indeed, the content conversion model 306 can determine, from the compatibility graph 308, that multiple conversions are necessary to convert the content item into the text representation 310. For example, the content conversion model 306 converts a digital video into an audio clip in a first step (e.g., by using an API to access a model for extracting data channels from the digital video) and converts the audio clip into a transcript (e.g., by using an API to access a transcription model) in a second step. To further illustrate, the content item segmenting system 106 can utilize the content conversion model 306 to convert a video to a text representation 310 of the video. Further, in some implementations, to convert content items to a text representation 310, the content conversion model 306 can utilize various intermediate systems, such as, for instance, a transcription system.

As indicated above, in one or more embodiments, the content conversion model 306 can cache intermediate or finalized digital content. For example, when the content item segmenting system 106 utilizes the content conversion model 306 to generate a text representation 310 of a content item 304, the content conversion model 306 can cache the text representation 310. Thus, the next time the content item segmenting system 106 uses that content item in a workflow, the content item segmenting system 106 need not regenerate the text representation 310. Instead, the content item segmenting system 106 can simply access the cached text representation 310, thus preserving computing resources that would otherwise be required to regenerate the text representation 310. Moreover, any further intermediate content can also be cached. For example, the content item segmenting system 106 can extract text segments from the text representation 310 and extract segment-specific text embeddings from the text segments as will be discussed in further detail with regard to FIGS. 4 and 5. These text segments and their respective segment-specific text embeddings can also be cached for further use by the content item segmenting system 106. This caching capability of the content item segmenting system 106 provides performance benefits over conventional large language model systems by minimizing the required computational resources for generating responses from large language models.

Figure 4:
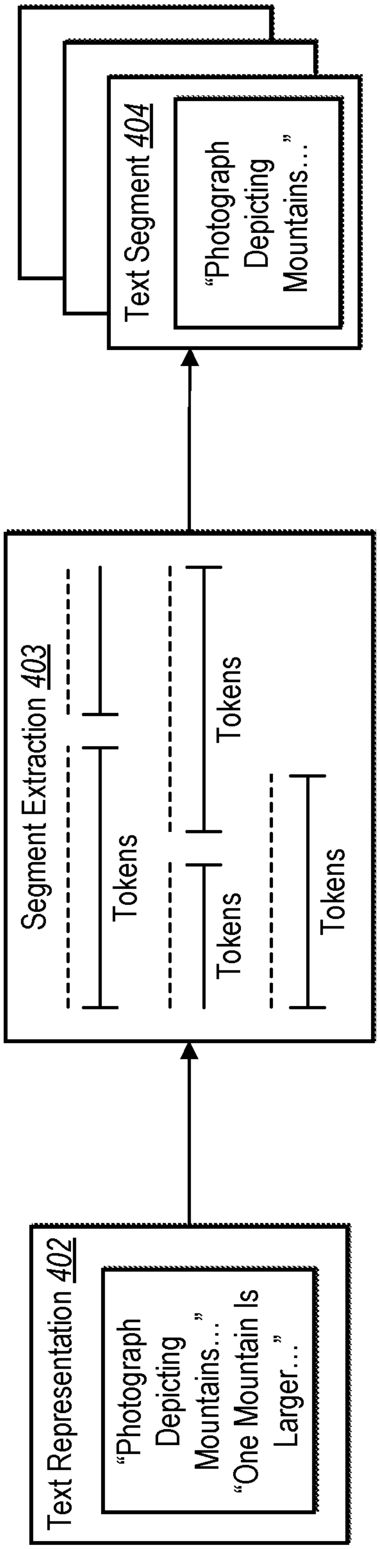
FIG. 4 illustrates an example diagram of the content item segmenting system extracting text segments from the text representation in accordance with one or more embodiments.

As mentioned previously, in one or more implementations, the content item segmenting system 106 can extract text segments from text representations. For example, FIG. 4 illustrates an overview of the content item segmenting system 106 extracting text segments from the text representation 402 in accordance with one or more embodiments. As described, the content item segmenting system 106 generates the text representation 402 by converting a content item using a content conversion model. In some embodiments, the content item segmenting system 106 further extracts text segments from the text representation 402. For example, the content item segmenting system 106 utilizes a content conversion model to perform a segment extraction 403. By utilizing a content conversion model (e.g., content conversion model 306), the content item segmenting system 106 can perform a segment extraction 403 on the text representation 402 to extract text segment, for example the text segment 404, for further use by the content item segmenting system 106 in later operations as will be discussed in further detail below.

In one or more embodiments, as part of the segment extraction 403, the content item segmenting system 106 can divide the text representation 402 into text segments, each having a set number of tokens. As noted above, a text representation 402 can have large amounts of text (e.g., thousands, tens of thousands, or millions of tokens). For example, a text representation 402 of a content item, for instance, text representation 402 of a photograph, can include thousands of words for describing the photograph. For example, the text representation 402 can include a description summarizing a photograph (e.g., "photograph depicting mountains . . . ") or further, descriptions of details of the content item (e.g., "one mountain is larger than the other . . . ") as shown in FIG. 4. Moreover, the text representation 402 comprises large numbers of tokens which can represent the characters of the text representation 402 such as letters of the alphabet, spaces, punctuation, etc. The content item segmenting system 106 can extract text segments, such as the text segment 404, from the text representation 402 such that each text segment can have a set number of tokens (e.g., 256 tokens or some other number of tokens based on a prompt length capacity of a downstream large language model).

Furthermore, in one or more embodiments, the content item segmenting system 106 can maintain the organization of the extracted text segments. For example, through the segment extraction the content item segmenting system 106 extracts many text segments and can maintain the order in which the text segments appear in the text representation 402. Additionally, in one or more embodiments, the content item segmenting system 106 can identify the location of any given text segment, such as the text segment 404, within the text representation 402 (thus determining the portions of the source content item corresponding to the text segment 404).

Figure 5:
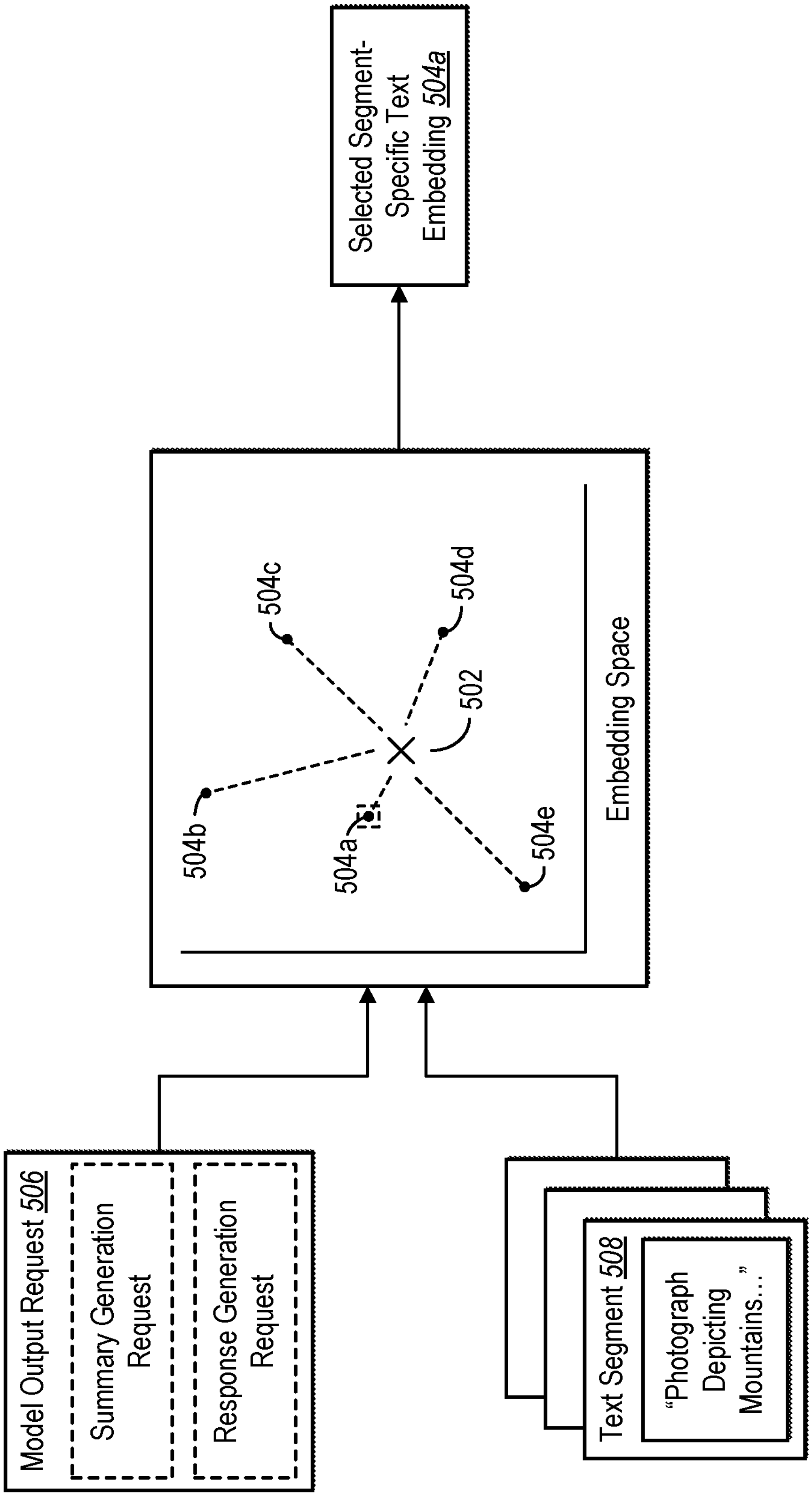
FIG. 5 illustrates an exemplary workflow of an embedding comparison for selection of segment-specific text embeddings in accordance with one or more embodiments.

As discussed above the content item segmenting system 106 can generate or extract embeddings from text segments and can compare the embeddings with an embedding extracted from a model output request. In particular, the content item segmenting system 106 can perform an embedding comparison to determine one or more segment-specific text embeddings nearest an output request embedding. For example, FIG. 5 illustrates an exemplary workflow of an embedding comparison for selecting from among segment-specific text embeddings 504*a-e* in accordance with one or more embodiments. In particular, the content item segmenting system 106 can receive a model output request 506 from a client device. The model output request 506 can include a variety of output request types, for instance, a summary generation request (e.g., a request to generate a summary from portions of one or more content items) or a response generation request (e.g., a request to generate an answer regarding content in portions of one or more content items). Furthermore, the content item segmenting system 106 can extract an output request embedding 502 from the model output request 506 for use in an embedding comparison as will be discussed in further detail below. In one or more embodiments, the content item segmenting system 106 extracts the output request embedding 502 from the model output request 506 by generating a latent vector representation of the model output request 506 in an embedding space (e.g., using a large language model or another neural network).

Additionally, in one or more embodiments, the content item segmenting system 106 can also extract segment-specific text embeddings 504*a-e* corresponding to the text segments 508 of the text representation for the embedding comparison. For example, the content item segmenting system 106 can extract segment-specific text embeddings 504*a-e* from the text segments 508 of the text representation. Indeed, the content item segmenting system 106 can extract the segment-specific text embeddings 504*a-e* by generating a latent vector representation of each text segment 508 in an embedding space.

Further, in some embodiments the content item segmenting system 106 can determine or select one or more segment-specific text embeddings corresponding to the model output request 506. For example, the content item segmenting system 106 can compare the output request embedding 502 with the segment-specific text embeddings 504*a-e* in the embedding space by determining the distance of each segment-specific text embedding 504*a-e* from the output request embedding 502, as depicted in the embedding space representation of FIG. 5. Moreover, upon determining the distance of each segment-specific text embedding 504*a-e* from the output request embedding 502 the content item segmenting system 106 can determine the relevant segment-specific text embeddings 504*a-e* with respect to the output request embedding 502. More specifically, in some embodiments, based on the output request embedding 502, the content item segmenting system 106 can determine one or more segment-specific text embeddings nearest (or within a threshold distance of) the output request embedding 502 in the embedding space. For example, as illustrated in FIG. 5, the content item segmenting system 106 can determine that the segment-specific text embedding 504*a* is nearest the output request embedding 502 in the embedding space and therefore selects the segment-specific text embedding 504*a*. In some cases, the content item segmenting system 106 selects multiple relevant segment-specific text embeddings and thus provides the corresponding text segments to a large language model.

Figure 6:
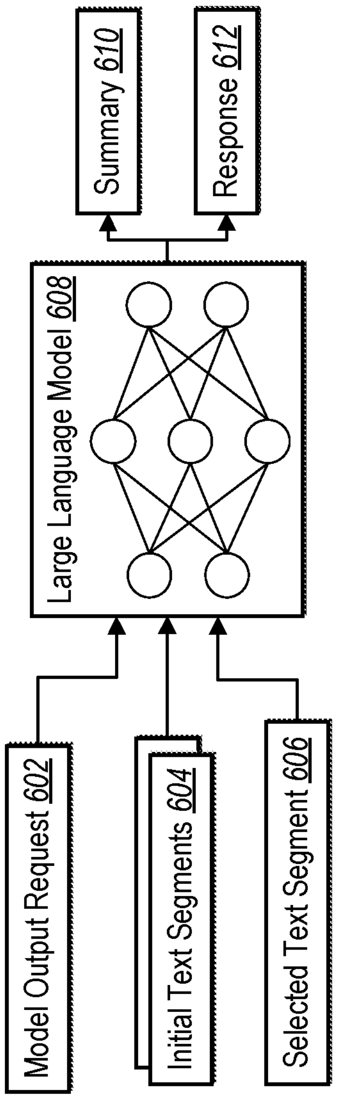
FIG. 6 illustrates an exemplary workflow of the content item segmenting system generating a model output by passing a model output request with selected text segments to a large language model in accordance with one or more embodiments.

Upon selection of the segment-specific text embedding/s, the content item segmenting system 106 can generate a model output from the large language model as discussed above. For instance, FIG. 6 illustrates an exemplary workflow of the content item segmenting system 106 generating a model output by passing a model output request with selected text segments to a large language model 608 in accordance with one or more embodiments. Specifically, the content item segmenting system 106 can select the text segments corresponding to the selected segment-specific text embeddings to pass to the large language model 608 with the model output request 602. In one or more embodiments, the content item segmenting system 106 can pass a single selected text segment 606, to the large language model 608. For example, a selected text segment 606 can be sent with the model output request 602 to the large language model 608 as illustrated in FIG. 6. In some embodiments, the content item segmenting system 106 can pass a threshold number of additional text segments corresponding to the model output request 602 to the large language model 608. For instance, the content item segmenting system 106 provides multiple text segments in cases where the content item segmenting system 106 determines more than one relevant segment-specific text embedding and/or when passing initial text segments 604 in addition to the relevant segment-specific text embeddings.

Indeed, in one or more embodiments, the content item segmenting system 106 can further pass a threshold number of additional initial text segments 604 to the large language model 608. Specifically, the content item segmenting system 106 can pass a threshold number of text segments to the large language model 608 in addition to the selected text segments 606 corresponding to the selected segment-specific text embeddings. The content item segmenting system 106 can pass these additional text segments 604 to the large language model 608 to provide context for the large language model 608 in generating the model output. In some embodiments, these additional text segments can include initial text segments from the text representation, for example, initial text segments 604 as illustrated in FIG. 6. In one or more embodiments, the additional text segments for example, initial text segments 604, can include a first text segment beginning at the start point of the text representation and a second text segment beginning immediately after the first text segment (or at another location in the text representation, such as a location corresponding to a topic change in the text representation). In other words, the content item segmenting system 106 can pass the first two text segments (and/or any other initial segments) of the text representation to the large language model 608 to provide the model with contextual information to guide its process in generating a model output. One benefit, by way of example, and not limitation, of providing this context, is that by doing so the content item segmenting system 106 can improve the accuracy of the model output relative conventional large language model systems.

Furthermore, in some implementations, the content item segmenting system 106 can pass to the large language model 608, with the selected text segment 606, a text segment that is semantically dissimilar to the model output request 602 for broader context. Indeed, as discussed above with respect to FIG. 5, the content item segmenting system 106 can determine the nearness of each segment-specific text embedding to the output request embedding within the embedding space. As a result, the content item segmenting system 106 can determine one or more of the segment-specific text embeddings as furthest from the output request embedding. Thus, the text segments corresponding to these segment-specific text embeddings furthest from the output request can be considered semantically dissimilar to the model output request 602. The content item segmenting system 106 can pass these semantically dissimilar text segments to the large language model with the selected text segment 606 to provide broader context of the selected content item/s. By doing so, the content item segmenting system 106 can generate a wider range of model outputs. For example, the content item segmenting system 106 can generate suggested model output requests as discussed in further detail below. Indeed, by passing these semantically dissimilar text segments to the large language model, the content item segmenting system 106 can generate suggested model output requests that can broadly encompass the entire selected content item or selection of content items.

Additionally, in one or more embodiments, the content item segmenting system 106 can utilize clustering techniques to select additional text segments to pass to the large language model. For example, the content item segmenting system 106 can utilize k-means clustering of the segment-specific text embeddings in the embedding space to determine groupings of segment-specific text embeddings separate from those segment-specific text embeddings closest to the output request embedding. Further, the content item segmenting system 106 can then select the text segments corresponding to these segment-specific text embedding groupings determined via k-means clustering to pass to the large language model. Moreover, the content item segmenting system 106 can utilize these additional k-means-selected text segments to generate, via the large language model, a content item summary or to generate responses to broad model output requests corresponding to the overall content of a content item (e.g., "what is this file about?," "what are some key takeaways of this file?"). Generation of content item summaries and responses will be discussed in further detail below, for example, with respect to FIGS. 8A-8B.

In one or more embodiments, the content item segmenting system 106 can generate a model output, such as a summary 610 or a response 612, from the large language model 608 that is accurate and specific to the content item. For instance, the content item segmenting system 106 can improve accuracy by not only passing one or more relevant text segments of the text representation of the content item to the large language model 608 but also by omitting one or more irrelevant text segments from the large language model 608. That is, by passing only the relevant text segments and omitting the irrelevant text segments to the large language model 608, the large language model 608 is less likely to hallucinate (and further avoids the cost of providing excessively long prompts). Further, the content item segmenting system 106 achieves this accuracy by passing only text segments from the selected content item to the large language model 608 which also prevents hallucination by restricting the data set from which the large language model 608 can draw in generating the model output. In contrast, conventional large language models draw from large data sets, such as from the entire internet. Additionally, the content item segmenting system 106 ensures specificity of the model output to the selected content item/s by only passing text segments from the selected content item/s and restricting the large language model 608 to the use of only these text segments in generating the model output.

Figure 7:
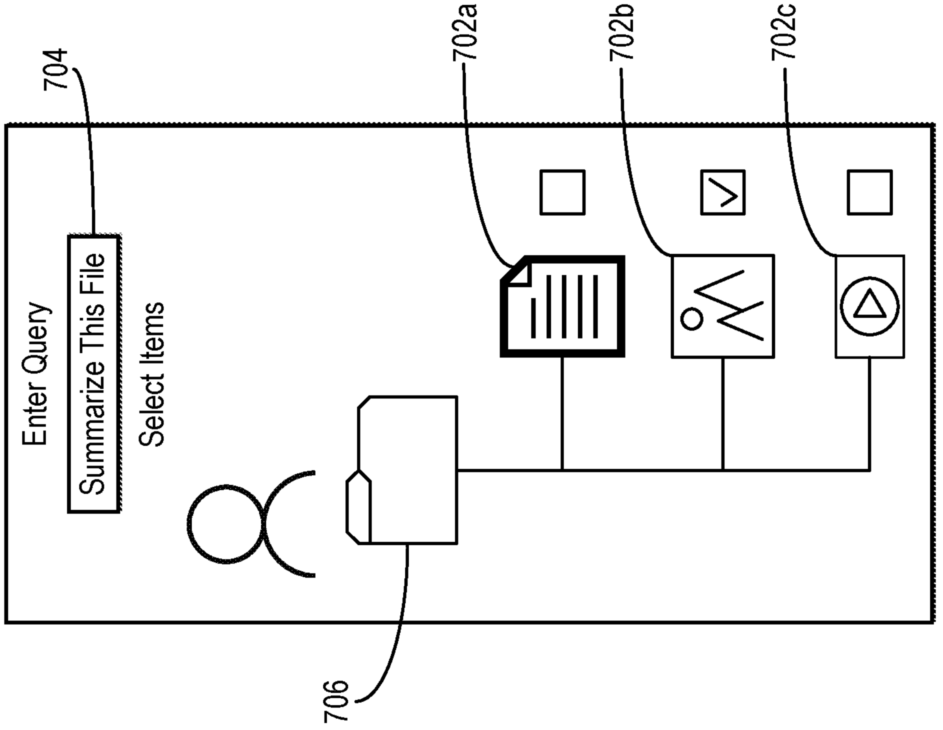
FIG. 7 illustrates a portion of an exemplary user interface that the content item segmenting system utilizes to select content items and receive a model output request in accordance with one or more embodiments.

In some implementations, the content item segmenting system 106 can generate a model output from one or more content items associated with a user account. For example, FIG. 7 illustrates a portion of an exemplary user interface (as presented on a client device) that the content item segmenting system 106 utilizes to select content items and receive a model output request in accordance with one or more embodiments. For instance, as illustrated in FIG. 7 the user account can have multiple content items 702*a-c*, such as a text document 702*a*, a photograph 702*b*, and a video 702*c* as illustrated in FIG. 7. The content item segmenting system 106 can select one or more content items 702*a-c* for analysis with a single model output request. For example, in FIG. 7 the photograph 702*b* is selected for analysis with a model output request, specifically a summary generation request 704.

In some embodiments, more than a single content item can be selected for analysis with a model output request. Indeed, the content item segmenting system 106 can select the text document and the video shown in FIG. 7 in addition to the selected photograph 702*b* illustrated in FIG. 7. In such a case, the content item segmenting system 106 can analyze each of the selected documents with the single model output request, for example, the summary generation request 704 or a response generation request. Moreover, in some implementations, the content item segmenting system 106 can select multiple content items 702*a-c* by selecting a folder 706 or multiple folders storing content items. In the case of the content item segmenting system 106 selecting one or more folders, the content item segmenting system 106 can analyze all of the content contained within the selected folder or folders with the model output request (e.g., by extracting text representations from the content items and providing the relevant text segments to a large language model).

Moreover, in some embodiments, the content item segmenting system 106 can determine source content items corresponding to the text segments provided to the large language model. For example, in some implementations, the content item segmenting system 106 can select multiple content items for analysis under the model output request as described above. Further, in these or other embodiments, the content item segmenting system 106 can select text segments from some or all of the selected content items to generate the model output by passing the text segments to the large language model. Moreover, the content item segmenting system 106 selects text segments according to the methods of embodiments previously described with respect to FIGS. 2-6. Furthermore, the content item segmenting system 106 can determine the content items (i.e., the source content items) that include digital content corresponding to the text segments provided to the large language model.

Additionally, in some embodiments, the content item segmenting system 106 can generate for display a ranked list of the source content items corresponding to the text segments provided to the large language model. For example, the content item segmenting system 106 can generate a ranked list of the source content items for display on the client device with the model output. Indeed, the content item segmenting system 106 can generate the ranked list based on the nearness of the segment-specific text embeddings corresponding to the selected text segments to the output request embedding.

Further, in one or more implementations, the content item segmenting system 106 can also access information generated by a document management system (e.g., DocSend®) to generate a model output from a large language model directed toward content item analytics. For example, the document management system can generate content item analytics (e.g., which users have viewed the item, how many times the item has been viewed, when the item has been viewed, etc.) for content items associated with a user account. In these or other embodiments, the content item segmenting system 106 can select one or more content items and receive a model output request from a client device regarding content item analytics. Further, the content item segmenting system 106 can generate a model output specific to the content item analytics of the selected content items in a similar manner as described above with respect to FIGS. 2-6. For instance, the content item segmenting system 106 can utilize a content conversion model to convert the content item analytics to a text representation, generate text segments from the text representation, and select one or more text segments to pass to the large language model with the model output request as discussed in FIGS. 2-6.

Moreover, in one or more embodiments, the content item segmenting system 106 can generate a model output from a large language model directed toward metadata of one or more content items. For example, each content item has metadata associated therewith which the content item segmenting system 106 can access to generate a model output. Indeed, the content item segmenting system 106 can select one or more content items, receive a model output request specific to the metadata of the selected content item/s and generate a model output in a similar manner as described above with respect to FIGS. 2-6.

Additionally, the content item segmenting system 106 can prevent use of personally identifiable information ("PII") within the content item segmenting system 106. For example, the content item segmenting system 106 can determine which content items contain PII. The content item segmenting system 106 can then prevent generation of model outputs and/or suggested model output requests from any such PII containing content items. To further protect PII, the content item segmenting system 106 can prevent any preview of such selected content item/s within a graphical user interface associated with the content item segmenting system 106. For example, as discussed below with respect to FIGS. 8A and 8B, the content item segmenting system 106 can generate a preview of a selected content item for display with the model output. The content item segmenting system 106, however, can prevent this preview for PII containing content items.

Figure 8A:
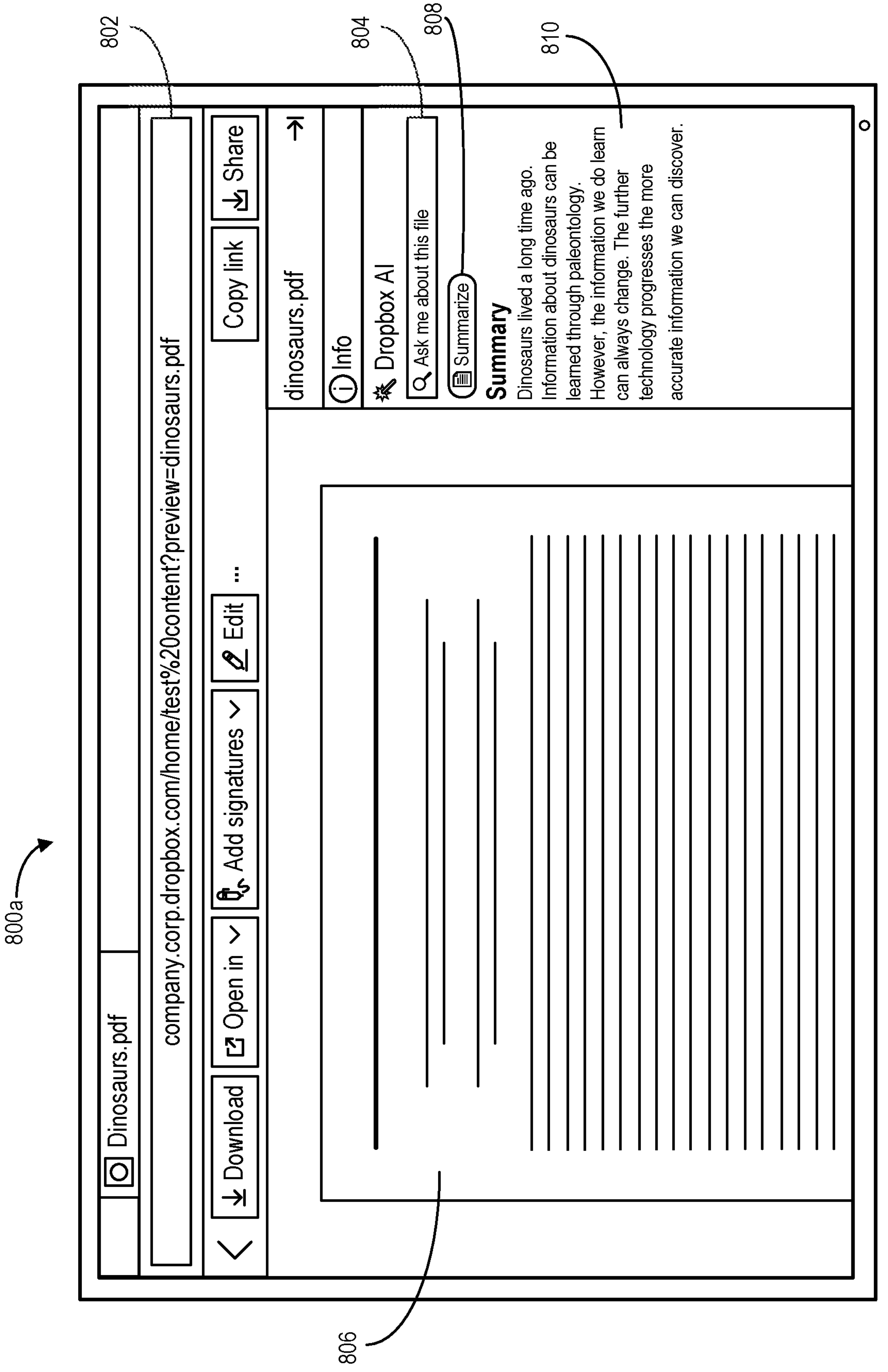
FIG. 8A illustrates an exemplary user interface of the content item segmenting system 106 for generating a content item summary in accordance with one or more embodiments.

As noted above, the content item segmenting system 106 can receive a model output request in the form of a summary generation request from a client device and, in response, generate a content item summary. FIG. 8A illustrates an exemplary user interface 800*a* of the content item segmenting system 106 for generating a content item summary 810 in accordance with one or more embodiments. For example, the user interface 800*a* can include a preview area for viewing the selected content item 806 and an address bar 802 showing the location of the selected content item 806. Additionally, the content item segmenting system 106 can include a tab for receiving inputs on the user interface 800*a*. For example, the tab can include a search bar 804 wherein the content item segmenting system 106 can receive a model output request (e.g., a summary generation request or a response generation request). Further, the tab can include a button 808 through which the content item segmenting system 106 can receive a summary generation request. Moreover, the tab can include a display area for the model outputs, such as a content item summary 810 and other outputs of the content item segmenting system 106.

In some embodiments, the content item segmenting system 106 can generate a content item summary 810 in response to receiving a summary generation request as illustrated in FIG. 8A. For example, the content item segmenting system 106 can receive the summary generation request through the button 808. In response to receiving the summary generation request, the content item segmenting system 106 can generate the content item summary 810 by passing the summary generation request with one or more selected text segments of a text representation of the selected content item 806 to the large language model using the methods described above with respect to FIGS. 2-7.

Further, in some implementations, the content item segmenting system 106 can generate, for display with the model output, one or more content item locations of the text segment/s provided to the large language model. For example, in some implementations, when generating the model output, the content item segmenting system 106 can provide multiple text segments to the large language model from a selected content item 806. Moreover, the content item segmenting system 106 can determine the content item locations corresponding to the provided text segments within the selected content item 806.

Additionally, in some embodiments, the content item segmenting system 106 can generate for display with the model output an indication of the content item location. For example, as described above, the content item segmenting system 106 can determine the locations within the selected content item 806 of content corresponding to the text segments provided to the large language model when generating the model output. Indeed, the content item segmenting system 106 can determine the location within the selected content item 806 corresponding to the text segment within the text representation of the selected content item 806. In these or other embodiments, the content item segmenting system 106 can generate an indication of these content item locations for display on the client device with the model output.

Figure 8B:
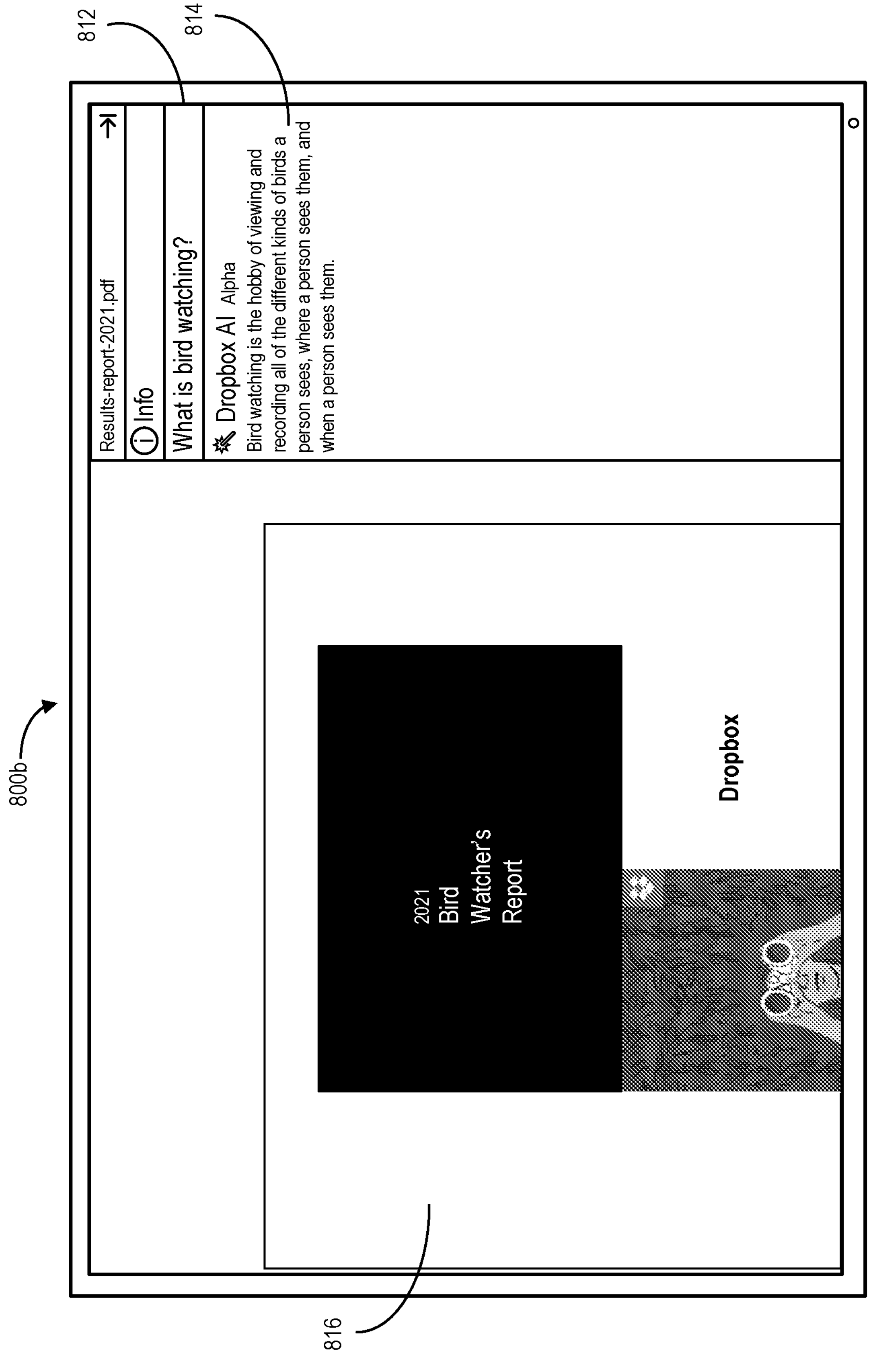
FIG. 8B illustrates an exemplary user interface of the content item segmenting system for generating a response in response to a response generation request in accordance with one or more embodiments.

As noted above, the content item segmenting system 106 can receive a model output request in the form of a request to generate a query response. In response to receiving a response generation request from a client device, the content item segmenting system 106 can generate a response. For instance, FIG. 8B illustrates an exemplary user interface 800*b* of the content item segmenting system 106 for generating a response 814 in response to a response generation request in accordance with one or more embodiments. Specifically, the user interface 800*b* can include user interface elements similar to those of the user interface 800*a*. For example, the user interface 800*b* can include a preview area for viewing the selected content item 816 and an address bar (not shown) for showing the location of the selected content item 816. Additionally, the user interface 800*b* can include a user interface tab that the content item segmenting system 106 can utilize to receive input. For example, the tab can include a search bar 812 wherein the content item segmenting system 106 can receive a model output request (e.g., a summary generation request or a response generation request). Further, the tab can optionally include a button (not shown) through which the content item segmenting system 106 can receive a summary generation request. Moreover, the tab can include a display area for the model outputs, such as a response 814 to a response generation request.

As mentioned previously, in response to receiving a response generation request from a client device, the content item segmenting system 106 can generate a response 814. Indeed, the content item segmenting system 106 can receive a model output request such as a response generation request from a client device. For example, in one or more implementations, the content item segmenting system 106 can receive a response generation request (e.g., "what is bird watching?") via the search bar 812 of the user interface 800*b*. Further, in response to receiving the response generation request, the content item segmenting system 106 can generate the model output, for example, the response 814 as illustrated in FIG. 8B. The content item segmenting system 106 can generate the model output, such as the response 814 using the methods taught in the embodiments described with respect to FIGS. 2-7. For example, the content item segmenting system 106 can generate the model output by passing selected text segments corresponding the selected segment-specific text embeddings to the large language model. Indeed, the content item segmenting system 106 can pass the selected text segments to the large language model together with the model output request.

Furthermore, in one or more implementations, the content item segmenting system 106 can generate suggested model output requests specific to the selected content item/s for display on a client device with the model output. For instance, the content item segmenting system 106 can determine a threshold number of segment-specific text embeddings corresponding to text segments generated from the text representation of the selected content item/s as described with respect to other embodiments. Moreover, the content item segmenting system 106 can pass the selected text segments corresponding to the threshold number of segment-specific text embeddings to the large language model. Further, the content item segmenting system 106 can utilize the large language model to determine the suggested model output requests based on the model output and the provided text segments. Additionally, the content item segmenting system 106 can provide for display the suggested model output requests with the model output, for example on a client device. As noted above, the content item segmenting system 106 can also provide semantically dissimilar text segments to the large language model with the model output request to provide broader context to the large language model and generate a wider range of possible model outputs. Further, the content item segmenting system 106 can include a set of rules for generating suggested model output requests that will prevent hallucination or other bad or minimally useful model outputs.

Moreover, the content item segmenting system 106 can include a feedback loop to improve model output generation. For example, in some embodiments, the content item segmenting system 106 can provide, for display with the model output on a graphical user interface, user interface elements for receiving feedback. Further, in response to receiving feedback, for example on the quality of the model output and/or the suggested model output requests, the content item segmenting system 106 can incorporate the feedback to modify the parameters of the embedding comparison and/or to generate a new response. In one or more implementations, the content item segmenting system 106 can incorporate the feedback loop either online during implementation and/or offline before implementation.

FIGS. 1-8, the corresponding text, and the examples provide a number of different systems, methods, and non-transitory computer readable media for generating content-item-specific large language model responses from content items by sectioning or segmenting a content item and selecting relevant sections or portions of a content item to provide to a large language model to generate a corresponding output. In addition to the foregoing, embodiments can also be described in terms of flowcharts comprising acts for accomplishing a particular result. For example, FIG. 9 illustrates a flowchart of an example sequence of acts in accordance with one or more embodiments.

While FIG. 9 illustrates acts according to some embodiments, alternative embodiments may omit, add to, reorder, and/or modify any of the acts shown in FIG. 9. The acts of FIG. 9 can be performed as part of a method. Alternatively, a non-transitory computer readable medium can comprise instructions, that when executed by one or more processors, cause a computing device to perform the acts of FIG. 9. In still further embodiments, a system can perform the acts of FIG. 9. Additionally, the acts described herein may be repeated or performed in parallel with one another or in parallel with different instances of the same or other similar acts.

FIG. 9 illustrates an example series of acts 900 for generating content-item-specific large language model outputs from content items by sectioning or segmenting a content item and selecting relevant sections or portions of a content item to provide to a large language model to generate a corresponding output. The series of acts 900 can include an act 902 of generating a text representation that includes a plurality of text segments; an act 904 of extracting segment-specific text embeddings that correspond to respective portions of the text representation of the content item; an act 906 of determining a segment-specific text embedding corresponding to a model output request; and an act 908 of generating a model output by passing a text segment corresponding to the segment-specific text embedding to a large language model together with the model output request.

For example, in one or more embodiments, the series of acts 900 can include generating, from a content item utilizing a content conversion model, a text representation that includes a plurality of text segments each comprising a number of tokens of the text representation; extracting, from the plurality of text segments, segment-specific text embeddings that correspond to respective portions of the text representation of the content item; in response to receiving a model output request from a client device, determining a segment-specific text embedding corresponding to the model output request; and generating a model output by passing a text segment corresponding to the segment-specific text embedding to a large language model together with the model output request.

In one or more implementations, generating the text representation for the content item comprises utilizing the content conversion model to generate a set of text characters that describe the content item according to a compatibility graph.

Moreover, in some embodiments, extracting the segment-specific text embeddings comprises generating a latent vector representation for a segment-specific text embedding from among the segment-specific text embeddings.

In addition, in some implementations, the series of acts 900 can include receiving the model output request from the client device by receiving a summary generation request or a response generation request from the client device.

Furthermore, in some embodiments, determining the segment-specific text embedding corresponding to the model output request comprises extracting an output request embedding from the model output request; comparing the output request embedding with the segment-specific text embeddings; and selecting the segment-specific text embedding corresponding to the model output request based on comparing the output request embedding with the segment-specific text embeddings.

In some implementations, generating the model output comprises determining source content items that include digital content corresponding to text segments provided to the large language model to generate the model output; and generating a ranked list of the source content items for display on the client device.

Moreover, in some embodiments, generating the model output comprises determining a content item location within the content item corresponding to the text segment provided to the large language model to generate the model output; and providing an indication of the content item location for display on the client device.

In addition, in some implementations, the series of acts 900 can include generating, from a content item utilizing a content conversion model, a text representation that includes a plurality of text segments each comprising a number of tokens of the text representation; extracting, from the plurality of text segments, segment-specific text embeddings corresponding to respective portions of the text representation of the content item; determining a segment-specific text embedding corresponding to a model output request; and generating a model output by passing a text segment corresponding to the segment-specific text embedding to a large language model together with the model output request.

Furthermore, in some embodiments, the series of acts 900 can include generating the model output by passing, to the large language model, the text segment corresponding to the segment-specific text embedding along with a threshold number of initial text segments extracted from the text representation of the content item.

In one or more implementations, the series of acts 900 can include generating the model output by passing, to the large language model, the text segment corresponding to the segment-specific text embedding along with a threshold number of additional text segments corresponding to the model output request.

Moreover, in one or more embodiments, the series of acts 900 can include generating a suggested model output request specific to the content item to provide for display with the model output.

Additionally, in one or more implementations, the series of acts 900 can include receiving the model output request by receiving a summary generation request; and generating the model output by generating a content item summary in response to receiving the summary generation request by passing the text segment corresponding to the segment-specific text embedding to the large language model together with the model output request.

Moreover, in some embodiments, the series of acts 900 can include extracting an output request embedding from the model output request; and comparing the segment-specific text embeddings with the output request embedding to determine relevant text embeddings of the text representation.

In addition, in some implementations, the series of acts 900 can include passing at least one of the relevant text embeddings to the large language model; and omitting one or more irrelevant text embeddings from providing to the large language model.

Furthermore, in some embodiments, the series of acts 900 can include determining a location within the content item corresponding to the text segment within the text representation of the content item; and providing an indication of the location for display on the client device together with the model output.

In some implementations, the series of acts 900 can include generating, from a content item, a text representation that includes a plurality of text segments each comprising a number of tokens of the text representation; extracting, from the plurality of text segments, segment-specific text embeddings that correspond to respective portions of the text representation of the content item; in response to receiving a model output request, determine a segment-specific text embedding corresponding to the model output request; and generating a model output by passing a text segment corresponding to the segment-specific text embedding to a large language model together with the model output request.

Moreover, in some embodiments, the series of acts 900 can include generating the model output by passing, to the large language model, the text segment corresponding to the segment-specific text embedding along with a first text segment beginning at a start point of the text representation and a second text segment beginning immediately after the first text segment.

In addition, in some implementations, the series of acts 900 can include generating a suggested model output request specific to the content item to provide for display with the model output by utilizing the large language model to determine the suggested model output request based on the model output and the text segment provided to the large language model.

Furthermore, in some embodiments, the series of acts 900 can include receiving the model output request by receiving a response generation request; and generating the model output by generating a response in response to the response generation request by passing the text segment corresponding to the segment-specific text embedding to the large language model together with the model output request.

In addition, in some implementations, the series of acts 900 can include extracting the text segments from the text representation by dividing the text representation into segments having a set number of tokens.

The components of the content item segmenting system 106 can include software, hardware, or both. For example, the components of the content item segmenting system 106 can include one or more instructions stored on a computer-readable storage medium and executable by processors of one or more computing devices. When executed by one or more processors, the computer-executable instructions of the content item segmenting system 106 can cause a computing device to perform the methods described herein. Alternatively, the components of the content item segmenting system 106 can comprise hardware, such as a special purpose processing device to perform a certain function or group of functions. Additionally, or alternatively, the components of the content item segmenting system 106 can include a combination of computer-executable instructions and hardware.

Furthermore, the components of the content item segmenting system 106 performing the functions described herein may, for example, be implemented as part of a stand-alone application, as a module of an application, as a plug-in for applications including content management applications, as a library function or functions that may be called by other applications, and/or as a cloud-computing model. Thus, the components of the content item segmenting system 106 may be implemented as part of a stand-alone application on a personal computing device or a mobile device.

Embodiments of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
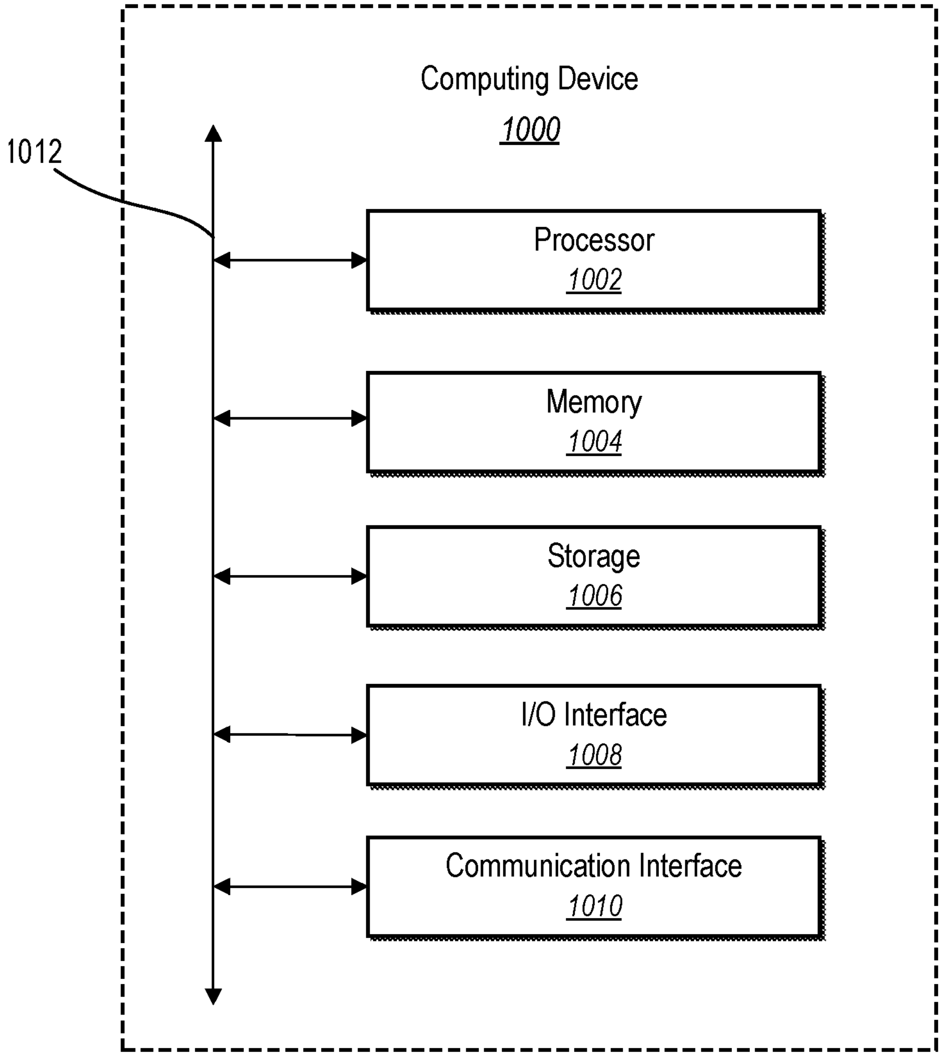
FIG. 10 illustrates a block diagram of an exemplary computing device (e.g., the server(s) and/or the client device) that may be configured to perform one or more of the processes described in accordance with one or more embodiments.

FIG. 10 illustrates a block diagram of exemplary computing device 1000 (e.g., the server(s) 102 and/or the client device 110) that may be configured to perform one or more of the processes described above. One will appreciate that server(s) 102 and/or the client device 110 may comprise one or more computing devices such as computing device 1000. As shown by FIG. 10, computing device 1000 can comprise processor 1002, memory 1004, storage device 1006, I/O interface 1008, and communication interface 1010, which may be communicatively coupled by way of communication infrastructure 1012. While an exemplary computing device 1000 is shown in FIG. 10, the components illustrated in FIG. 10 are not intended to be limiting. Additional or alternative components may be used in other implementations. Furthermore, in certain implementations, computing device 1000 can include fewer components than those shown in FIG. 10. Components of computing device 1000 shown in FIG. 10 will now be described in additional detail.

In particular implementations, processor 1002 includes hardware for executing instructions, such as those making up a computer program. As an example, and not by way of limitation, to execute instructions, processor 1002 may retrieve (or fetch) the instructions from an internal register, an internal cache, memory 1004, or storage device 1006 and decode and execute them. In particular implementations, processor 1002 may include one or more internal caches for data, instructions, or addresses. As an example, and not by way of limitation, processor 1002 may include one or more instruction caches, one or more data caches, and one or more translation lookaside buffers (TLBs). Instructions in the instruction caches may be copies of instructions in memory 1004 or storage device 1006.

Memory 1004 may be used for storing data, metadata, and programs for execution by the processor(s). Memory 1004 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1004 may be internal or distributed memory.

Storage device 1006 includes storage for storing data or instructions. As an example, and not by way of limitation, storage device 1006 can comprise a non-transitory storage medium described above. Storage device 1006 may include a hard disk drive (HDD), a floppy disk drive, flash memory, an optical disc, a magneto-optical disc, magnetic tape, or a Universal Serial Bus (USB) drive or a combination of two or more of these. Storage device 1006 may include removable or non-removable (or fixed) media, where appropriate. Storage device 1006 may be internal or external to computing device 1000. In particular implementations, storage device 1006 is non-volatile, solid-state memory. In other implementations, Storage device 1006 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1008 allows a user to provide input to, receive output from, and otherwise transfer data to and receive data from computing device 1000. I/O interface 1008 may include a mouse, a keypad or a keyboard, a touch screen, a camera, an optical scanner, network interface, modem, other known I/O devices or a combination of such I/O interfaces. I/O interface 1008 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interface 1008 is configured to provide graphical data to a display for presentation to a user. The graphical data may be representative of one or more graphical user interfaces and/or any other graphical content as may serve a particular implementation.

Communication interface 1010 can include hardware, software, or both. In any event, communication interface 1010 can provide one or more interfaces for communication (such as, for example, packet-based communication) between computing device 1000 and one or more other computing devices or networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI.

Additionally, or alternatively, communication interface 1010 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1010 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 1010 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 1012 may include hardware, software, or both that couples components of computing device 1000 to each other. As an example and not by way of limitation, communication infrastructure 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 11:
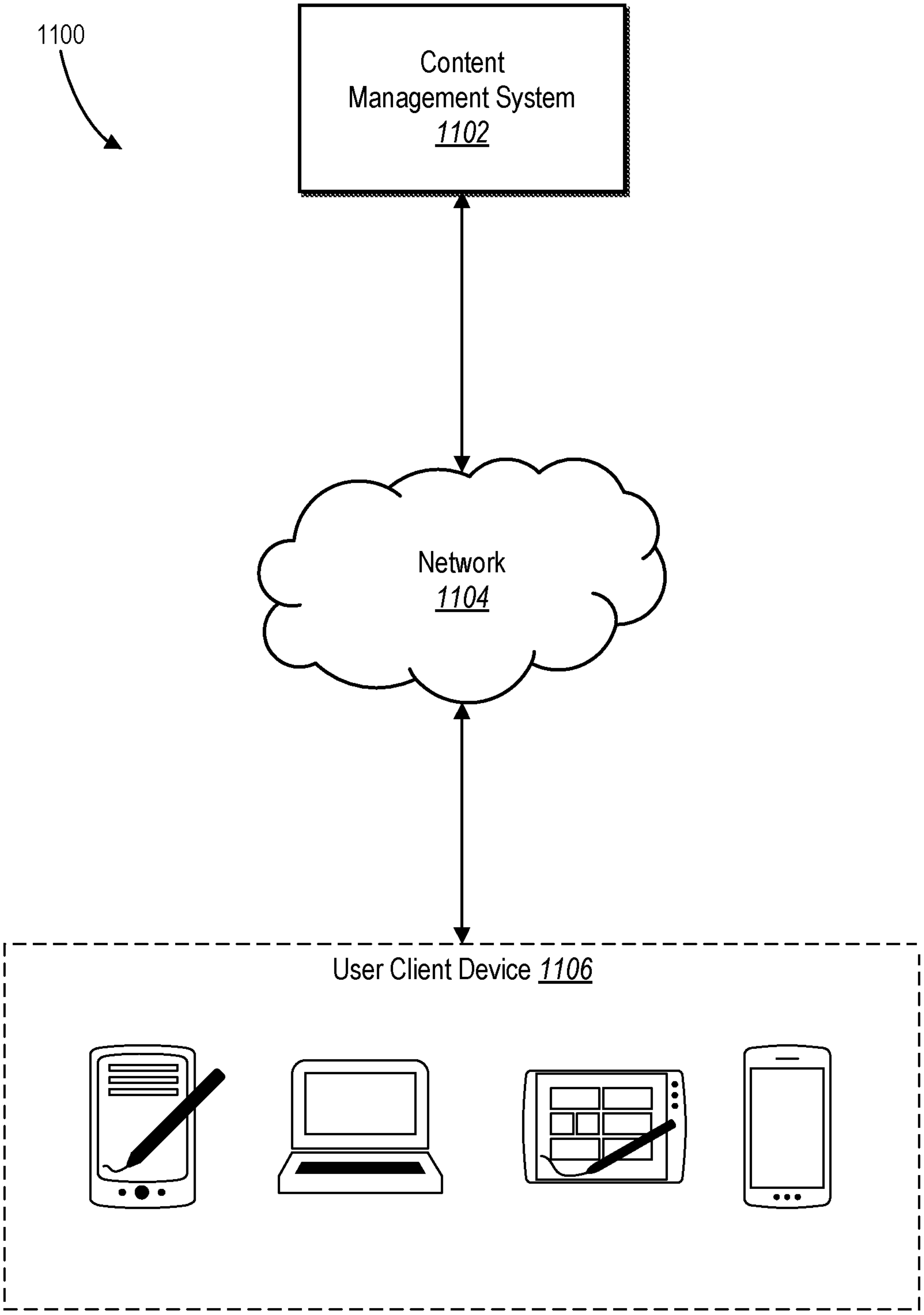
FIG. 11 illustrates a schematic diagram illustrating an exemplary environment within which one or more implementations of the content item segmenting system can be implemented in accordance with one or more embodiments.

FIG. 11 is a schematic diagram illustrating environment 1100 within which one or more implementations of the content item segmenting system 106 can be implemented. For example, the content item segmenting system 106 may be part of a content management system 1102 (e.g., the content management system 104). Content management system 1102 may generate, store, manage, receive, and send digital content (such as digital content items). For example, content management system 1102 may send and receive digital content to and from client devices 1106 by way of network 1104. In particular, content management system 1102 can store and manage a collection of digital content. Content management system 1102 can manage the sharing of digital content between computing devices associated with a plurality of users. For instance, content management system 1102 can facilitate a user sharing a digital content with another user of content management system 1102.

In particular, content management system 1102 can manage synchronizing digital content across multiple client devices 1106 associated with one or more users. For example, a user may edit digital content using client device 1106. The content management system 1102 can cause client device 1106 to send the edited digital content to content management system 1102. Content management system 1102 then synchronizes the edited digital content on one or more additional computing devices.

In addition to synchronizing digital content across multiple devices, one or more implementations of content management system 1102 can provide an efficient storage option for users that have large collections of digital content. For example, content management system 1102 can store a collection of digital content on content management system 1102, while the client device 1106 only stores reduced-sized versions of the digital content. A user can navigate and browse the reduced-sized versions (e.g., a thumbnail of a digital image) of the digital content on client device 1106. In particular, one way in which a user can experience digital content is to browse the reduced-sized versions of the digital content on client device 1106.

Another way in which a user can experience digital content is to select a reduced-size version of digital content to request the full- or high-resolution version of digital content from content management system 1102. In particular, upon a user selecting a reduced-sized version of digital content, client device 1106 sends a request to content management system 1102 requesting the digital content associated with the reduced-sized version of the digital content. Content management system 1102 can respond to the request by sending the digital content to client device 1106. Client device 1106, upon receiving the digital content, can then present the digital content to the user. In this way, a user can have access to large collections of digital content while minimizing the amount of resources used on client device 1106.

Client device 1106 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. Client device 1106 may execute one or more client applications, such as a web browser (e.g., Microsoft Windows Internet Explorer, Mozilla Firefox, Apple Safari, Google Chrome, Opera, etc.) or a native or special-purpose client application (e.g., Dropbox Paper for iPhone or iPad, Dropbox Paper for Android, etc.), to access and view content over network 1104.

Network 1104 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 1106 may access content management system 1102.

In the foregoing specification, the present disclosure has been described with reference to specific exemplary implementations thereof. Various implementations and aspects of the present disclosure(s) are described with reference to details discussed herein, and the accompanying drawings illustrate the various implementations. The description above and drawings are illustrative of the disclosure and are not to be construed as limiting the disclosure. Numerous specific details are described to provide a thorough understanding of various implementations of the present disclosure.

The present disclosure may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

The foregoing specification is described with reference to specific exemplary implementations thereof. Various implementations and aspects of the disclosure are described with reference to details discussed herein, and the accompanying drawings illustrate the various implementations. The description above and drawings are illustrative and are not to be construed as limiting. Numerous specific details are described to provide a thorough understanding of various implementations.

The additional or alternative implementations may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A computer-implemented method comprising:

generating, from a content item utilizing a content conversion model, a text representation that includes a plurality of text segments each comprising a number of tokens of the text representation;

extracting, from the plurality of text segments, segment-specific text embeddings that correspond to respective portions of the text representation of the content item;

in response to receiving a model output request from a client device, determining a segment-specific text embedding corresponding to the model output request;

generating a model output by passing to a large language model one or more text segments corresponding to the segment-specific text embedding together with the model output request and additional text segments comprising a threshold number of tokens extracted from an initial portion of the text representation and a threshold number of tokens following a topic change in the text representation for providing context to guide the large language model;

caching the model output of the large language model for later reuse in response to generating the model output; and generating, utilizing the large language model to process the model output cached for later reuse, an additional model output for an additional model output request from the client device.

2. The computer-implemented method of claim 1, wherein generating the text representation for the content item comprises utilizing the content conversion model to generate a set of text characters that describe the content item according to a compatibility graph.

3. The computer-implemented method of claim 1, wherein extracting the segment-specific text embeddings comprises generating a latent vector representation for a segment-specific text embedding from among the segment-specific text embeddings.

4. The computer-implemented method of claim 1, further comprising receiving the model output request from the client device by receiving a summary generation request or a response generation request from the client device.

5. The computer-implemented method of claim 1, wherein determining the segment-specific text embedding corresponding to the model output request comprises:

extracting an output request embedding from the model output request;

comparing the output request embedding with the segment-specific text embeddings; and selecting the segment-specific text embedding corresponding to the model output request based on comparing the output request embedding with the segment-specific text embeddings.

6. The computer-implemented method of claim 1, wherein generating the model output comprises:

determining source content items that include digital content corresponding to text segments provided to the large language model to generate the model output; and generating a ranked list of the source content items for display on the client device.

7. The computer-implemented method of claim 1, wherein generating the model output comprises:

determining a content item location within the content item corresponding to the one or more text segments provided to the large language model to generate the model output; and providing an indication of the content item location for display on the client device.

8. A system comprising:

at least one processor; and a non-transitory computer readable medium storing instructions that, when executed by the at least one processor, cause the system to:

generate, from a content item utilizing a content conversion model, a text representation that includes a plurality of text segments each comprising a number of tokens of the text representation;

extract, from the plurality of text segments, segment-specific text embeddings corresponding to respective portions of the text representation of the content item;

determine a segment-specific text embedding corresponding to a model output request;

generate a model output by passing to a large language model a text segment corresponding to the segment-specific text embedding together with the model output request and additional text segments comprising a threshold number of tokens extracted from an initial portion of the text representation and a threshold number of tokens following a topic change in the text representation for providing context to guide the large language model;

caching the model output of the large language model for later reuse in response to generating the model output; and generating, utilizing the large language model to process the model output cached for later reuse, an additional model output for an additional model output request from a client device.

9. The system of claim 8, wherein the instructions cause the system to generate the text representation based on a compatibility graph that defines relationships between types of content items, the compatibility graph comprising nodes and edges that indicate conversion paths for converting a first content item of a first type to a second content item of a second type different from the first type.

10. The system of claim 8, wherein the instructions cause the system to generate the model output by passing, to the large language model, the text segment corresponding to the segment-specific text embedding along with a threshold number of additional text segments corresponding to the model output request.

11. The system of claim 8, further storing instructions that, when executed by the at least one processor, cause the system to generate a one or more suggested model output requests, for generating a range of possible model outputs, specific to the content item to provide for display with the model output by:

determining one or more text segments that are semantically dissimilar to the model output request; and generating, utilizing the large language model, the one or more suggested model output requests based on the one or more text segments that are semantically dissimilar to the model output request.

12. The system of claim 8, further storing instructions that, when executed by the at least one processor, cause the system to:

receive the model output request by receiving a summary generation request; and generate the model output by generating a content item summary in response to receiving the summary generation request by passing the text segment corresponding to the segment-specific text embedding to the large language model together with the model output request.

13. The system of claim 8, further storing instructions that, when executed by the at least one processor, cause the system to:

extract an output request embedding from the model output request; and compare the segment-specific text embeddings with the output request embedding to determine relevant text embeddings of the text representation.

14. The system of claim 13, further storing instructions that, when executed by the at least one processor, cause the system to:

pass at least one of the relevant text embeddings to the large language model; and omit one or more irrelevant text embeddings from providing to the large language model.

15. The system of claim 8, further storing instructions that, when executed by the at least one processor, cause the system to:

determine a location within the content item corresponding to the text segment within the text representation of the content item; and provide an indication of the location for display on a client device together with the model output.

16. A non-transitory computer readable medium storing instructions that, when executed by at least one processor, cause the at least one processor to:

generate, from a content item, a text representation that includes a plurality of text segments each comprising a number of tokens of the text representation;

extract, from the plurality of text segments, segment-specific text embeddings that correspond to respective portions of the text representation of the content item;

in response to receiving a model output request, determine a segment-specific text embedding corresponding to the model output request;

generate a model output by passing to a large language model a text segment corresponding to the segment-specific text embedding together with the model output request and additional text segments comprising a threshold number of tokens extracted from an initial portion of the text representation and a threshold number of tokens following a topic change in the text representation for providing context to guide the large language model;

caching the model output of the large language model for later reuse in response to generating the model output; and generating, utilizing the large language model to process the model output cached for later reuse, an additional model output for an additional model output request from a client device.

17. The non-transitory computer readable medium of claim 16, wherein the instructions cause the at least one processor to generate the model output by passing, to the large language model, the text segment corresponding to the segment-specific text embedding along with a first text segment beginning at a start point of the text representation and a second text segment beginning immediately after the first text segment.

18. The non-transitory computer readable medium of claim 16, further comprising instructions that, when executed by the at least one processor, cause the at least one processor to generate a suggested model output request specific to the content item to provide for display with the model output by utilizing the large language model to determine the suggested model output request based on the model output and the text segment provided to the large language model.

19. The non-transitory computer readable medium of claim 16, further comprising instructions that, when executed by the at least one processor, cause the at least one processor to:

receive the model output request by receiving a response generation request; and generate the model output by generating a response in response to the response generation request by passing the text segment corresponding to the segment-specific text embedding to the large language model together with the model output request.

20. The non-transitory computer readable medium of claim 16, further storing instructions that when executed by the at least one processor, cause the at least one processor to extract the plurality of text segments from the text representation by dividing the text representation into segments having a set number of tokens.

* * * * *